(12) United States Patent
Fisher et al.

(10) Patent No.: US 11,919,200 B2
(45) Date of Patent: Mar. 5, 2024

(54) ROOF COVER BOARD WITH IMPROVED FRAGMENT SIZE AND PLASTIC-TO-PAPER RATIO

(71) Applicant: Continuus Materials Intellectual Property, LLC, The Woodlands, TX (US)

(72) Inventors: Kasey Fisher, Philadelphia, PA (US); Marko Suput, Lompoc, CA (US); Matthew Spencer, Palatine, IL (US); Jack G. Winterowd, Puyallup, WA (US)

(73) Assignee: Continuus Materials Intellectual Property, LLC, The Woodlands, TX (US)

( * ) Notice: Subject to any disclaimer, the term of this patent is extended or adjusted under 35 U.S.C. 154(b) by 76 days.

(21) Appl. No.: 17/541,138

(22) Filed: Dec. 2, 2021

(65) Prior Publication Data

US 2023/0173713 A1 Jun. 8, 2023

(51) Int. Cl.

| | |
|---|---|
| *B29B 17/02* | (2006.01) |
| *B29B 17/04* | (2006.01) |
| *B29C 43/00* | (2006.01) |
| *B29K 1/00* | (2006.01) |
| *B29K 101/12* | (2006.01) |
| *B29K 105/26* | (2006.01) |
| *B29L 7/00* | (2006.01) |

(52) U.S. Cl.
CPC ............ *B29B 17/02* (2013.01); *B29B 17/04* (2013.01); *B29C 43/003* (2013.01); *B29B 2017/0224* (2013.01); *B29B 2017/0234* (2013.01); *B29K 2001/00* (2013.01); *B29K 2101/12* (2013.01); *B29K 2105/26* (2013.01); *B29L 2007/00* (2013.01)

(58) Field of Classification Search
None
See application file for complete search history.

(56) References Cited

U.S. PATENT DOCUMENTS

| | | | |
|---|---|---|---|
| 10,343,328 B1* | 7/2019 | Sherga | B29C 51/428 |
| 2010/0144905 A1* | 6/2010 | Reaveley | C10G 2/32 |
| | | | 44/589 |

FOREIGN PATENT DOCUMENTS

| | | |
|---|---|---|
| EP | 3 838 589 A1 | 6/2021 |
| WO | WO-2008/055149 A2 | 5/2008 |
| WO | WO-2019/094411 A2 | 5/2019 |

\* cited by examiner

*Primary Examiner* — Robert J Grun
(74) *Attorney, Agent, or Firm* — Foley & Lardner LLP

(57) ABSTRACT

Disclosed herein is a roof cover board and a method of manufacturing an improved cover board product. The method includes receiving waste materials or first use materials, the waste materials or first use materials containing a mixture of cellulose, plastic and other materials; separating the cellulose and the plastic from the mixture; shredding the separated cellulose using a first shredder into a stream of cellulose and shredding the separated plastic using a second shredder into a stream of plastic; selecting a cellulose to plastic ratio from a plurality of cellulose to plastic ratios; metering shredded cellulose from the stream of cellulose and shredded plastic from the stream of plastic according to the selected cellulose to plastic ratio; mixing the metered shredded cellulose and plastic; forming said mixture into a mat; and consolidating the mat into a finished good using heat and pressure.

47 Claims, 32 Drawing Sheets

ROOF COVER BOARD WITH IMPROVED FRAGMENT SIZE AND PLASTIC-TO-PAPER RATIO

BACKGROUND

Commercial roofs can be classified as either "low slope" or "steep slope". Low slope roofs have a pitch that is less than 25%. Most low slope roofs have a pitch of only 2% and steep slope roofs have a pitch that is greater than 25%. Low slope roofs have excellent water and puncture resistance and longevity. Low slope commercial roofs are typically comprised of four essential layers. The base of the assembly is typically a fluted steel deck. Less frequently, oriented strand board (OSB), plywood, or concrete are used as decking. A rigid insulating foam board, such as polyisocyanurate foam board or expanded polystyrene, is installed directly over the deck. A protective cover board is positioned directly over the insulating foam and is typically secured with screws that extend through the insulating foam and into the deck. A water-resistant membrane is then installed over the protective cover board and is attached to the cover board with either adhesives or induction welding.

Additional layers are sometimes incorporated into low slope roof assemblies. In many cases, an air and vapor barrier, such as polyethylene film (6 mil thick) is installed between the deck and the insulating foam. In some cases, rock ballast or concrete pavers can be placed on top of the water-resistant membrane.

Cover boards, and other building materials, can be manufactured from a variety of waste products including municipal solid waste (MSW), residuals from recycling centers, industrial waste, and other waste sources. The United States alone produces approximately 2 billion tons of waste materials each year. This discarded waste is a mixture that includes valuable plant-based polymers (cellulose/papers) materials and synthetic polymers (thermoplastics) materials. A mechanized sorting process can extract valuable papers and plastics. The papers and plastics are extracted, separated and sorted by type, dimension and density. The isolated materials are subsequently refined and then recombined and formed into panels, planks, and other shapes.

Cover boards and other building products require specific mechanical properties necessary to resist forces they might encounter in service. These forces include bending forces, wind uplift forces, impact, and water absorption. There is a need to understand the relationships between the constituent material characteristics in such products and how those relationships might impact product performance. To this end, there is a need to manufacture products using particular paper and plastic fragment sizes and also particular ratios of paper to plastic. Preferred fragment size and paper to plastic ratios can be deployed to alter the mechanical properties of products.

SUMMARY

Aspects of one embodiment of the present disclosure relate to a method of manufacturing an improved cover board product. The method may include receiving, by a waste diversion system, waste materials or first use materials; sizing the individual waste materials or first use materials to a targeted size; separating the waste materials or first use materials by type, size or shape; generating individual or mixed streams of refined materials that have a particular type, size and shape; recombining the refined materials at a targeted ratio of paper fragments to plastic fragments, and then organizing this preferred composition into a single layer or multilayer mat; and consolidating the layers or mat with heat and pressure into a finished good.

Aspects of another embodiment of the present disclosure relate to a method of manufacturing an improved cover board product. The method may include receiving waste materials or first use materials, the waste materials or first use materials containing a mixture of cellulose, plastic and other materials; separating the cellulose and the plastic from the mixture; shredding the separated cellulose using a first shredder having a first shredding size into a stream of cellulose and shredding the separated plastic using a second shredder having a second shredding size into a stream of plastic; selecting a cellulose to plastic ratio from a plurality of cellulose to plastic ratios; metering shredded cellulose from the stream of cellulose and shredded plastic from the stream of plastic according to the selected cellulose to plastic ratio; mixing the metered shredded cellulose and plastic; forming the mixture into a blended mat; and consolidating the blended mat into a finished good using heat and pressure.

Aspects of another embodiment of the present disclosure relate to a method of manufacturing an improved cover board product. The method may include receiving waste materials that include paper and thermoplastic articles; refining the received waste materials to a size of about 10" or less; processing the refined waste materials through one or more screens to generate a set of fragments having a size between about 2" and about 10"; using a wind sifter, separating a subset of the set of fragments responsive to each fragment of the subset having a density below a threshold, the subset comprising paper and plastic fragments; using a near infrared sorting device, separating the paper fragments from the subset; refining the separated paper fragments to a size of about 50 mm or less; and treating the refined separated paper fragments with one or more multifunctional aldehydes or a treatment composition derived from urea and one or more multifunctional aldehydes. Aspects of another embodiment of the present disclosure relate to a product manufactured using this method.

Aspects of another embodiment of the present disclosure relate to a method of manufacturing an improved cover board product. The method may include receiving waste materials that include paper and thermoplastic articles; refining the received waste materials to a size of about 10" or less; processing the refined waste materials through one or more screens to generate a set of fragments having a size between about 2" and about 10"; using a wind sifter, separating a subset of the set of fragments responsive to each fragment of the subset having a density below a threshold, the subset comprising paper and plastic fragments; using a near infrared sorting device, separating the plastic fragments from the subset; refining the separated plastic fragments to a size of about 50 mm or less; and treating the refined separated plastic fragments with one or more antimicrobial agents.

An example cover board product is manufactured according to the process described herein with varied paper fragment size to maximize the qualities of the board. Fragment or shred size is defined by the mesh size in screens that are used in conjunction with knives or cutters during the material refining process. In general, refined particles that pass through the screen will have at least two dimensions that are smaller than the mesh size of the screen. Shred size, specifically paper shred size, affects internal bonding (IB), water absorption, and thickness swell. Smaller shred size allows for the production of coverboards comprised of up to 60% OCC (old corrugated cardboard)-based paper fragments, while simultaneously meeting targeted product mechanical properties. When shredded to larger sizes OCC interferes with the internal bond of coverboards, limiting the amount that can be added. While a shred size of 12 mm for paper may be preferred for the best coverboard mechanical properties, as discussed herein, a variety of different shred sizes may be employed and, in some embodiments, one board may be manufactured with paper fragments having different shred sizes and/or plastic fragments having different shred sizes. In some embodiments, the use of fragments with different shred sizes allows for simultaneous optimization of both processing efficiency and panel properties.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
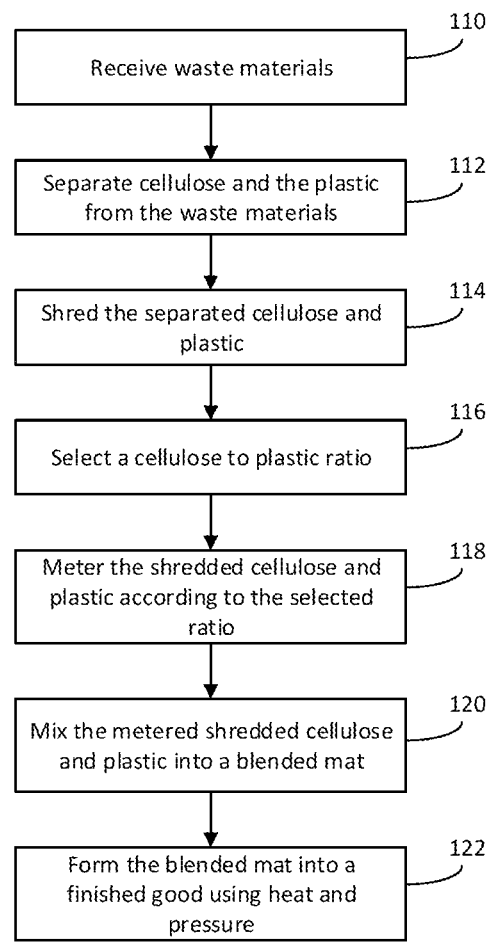
FIG. 1A is a flow diagram depicting operations performed in a cover board manufacturing process, in accordance with an example embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The present disclosure describes a roof cover board and the effects of different component shred sizes on cover board properties and process parameters. Shred or fragment size influences internal bonding, water absorption, thermal movement, fines production, and shredder throughput. Shred size does not generally have a significant impact on modulus of rupture (MOR), modulus of elasticity (MOE), or density. Exemplary embodiments described herein detail the unexpected result discovered that a small paper shred size is desirable for improved internal bonding and water resistance. Paper shred size has more influence on these board properties than plastic shred size. Small plastic shred size combined with small paper size results in better internal bond strength and water resistance but returns slowed shredder throughput and increased fines production. Use of small paper shred size with large plastic shred size still allows for above average mechanical properties results with minimal adverse impacts on throughput and fines production.

The present disclosure also indicates that old corrugated cardboard (OCC), which is a recycled material category, represented herein by shredded unused moving boxes and lightly used shipping boxes, can be incorporated into a cover board at up to 60% of the paper content at both 12 and 19 mm paper shred size. Exemplary embodiments show that increased plastic content leads to better board performance. In testing, sample boards at 40% plastic performed almost as well as the sample boards at 50%.

Moreover, the present disclosure teaches that fragment or shred size, specifically paper shred size, affects internal bonding (IB), water absorption, thickness swell, fines production, and OCC inclusion in cover boards. The example embodiments show that shred size does not have a significant impact on MOR, MOE, or density. In cases of the aforementioned impacts, smaller shred size yields better results with the exception of fines (e.g., dust or very small particles of paper or plastic) production. The smaller the shred size, the more fines that are produced in the shredder. Unexpectedly, the size of the paper fragments has a greater impact on board performance attributes than the size of the plastic fragments, as discussed below. In some embodiments, dust can be added back into the process and can be 0% to 15% of the finished good by weight.

The present disclosure teaches that MOR, MOE, and density are not impacted by changes in shred size in panels comprised of 40% to 50% plastic and 50% to 60% paper. This finding is counter to known art that is well established in the wood panel industry. In wood products smaller fragment sizes decrease bending strengths and bending modulus of elasticity. The findings presented specifically teach away from the established art in the wood panel industry.

Furthermore, the present disclosure also teaches that the ratio of paper fragments to plastic fragments should generally be in the range of about 70/30-50/50. A preferred range is about 65/35-55/45. Plastic fragment levels greater than about 50% result in panels with increased dimensional change in response to a given temperature change. This effect is undesirable for a roof cover board panel that is expected to experience substantial temperature change for different seasons or even for different times of the day. Conversely, plastic fragment levels less than about 25% can result in a roof cover board panel with insufficient internal bond strength. As previously stated, we have unexpectedly discovered that cover board panels can be made with plastic fragment levels in the core layer of only 30-40%, while simultaneously achieving excellent internal bond strength values, by use of paper fragments that are sized to about 19 mm or less.

For boards comprised of mixtures of paper fragments and plastic fragments (MPP), paper shred size significantly affects internal bond with plastic shred size having an impactful, but lesser, effect on the metric. In the case of boards comprised of fragments derived from shredding G#52 or Grade #52 waste cartons, smaller shreds also yield higher internal bonds (IBs).

FIG. 1A illustrates a flow diagram depicting operations performed in an example cover board manufacturing process. The operations depicted include receiving waste materials (110), separating cellulose and plastic from the waste materials (112), shredding the separated cellulose and plastic (114), selecting a cellulose to plastic ratio (116), metering the shredded cellulose and plastic according to the selected ratio (118), mixing the metered shredded cellulose and plastic (120), forming the mixture into a mat (XXX); and consolidating the mat into a finished good using heat and pressure (122). The operations described herein may be performed by a manufacturer using a manufacturing system such as the manufacturing systems described in U.S. patent application Ser. Nos. 17/171,766 and 16/761,720, the entirety of each of which is incorporated by reference herein. The operations may enable a manufacturing system to create finished goods, such as cover boards, with different performance characteristics over time for different applications.

In operation 110, waste materials (e.g., materials that have been disposed of), or even first used materials (e.g., materials that were created or purchased for the cover board manufacturing process), can be received by a manufacturing system to produce a roof cover board. As described herein, for succinctness, the terms "waste" and "first use materials" are used interchangeably. Waste can include mixed cellulose (e.g., paper) and plastic (e.g., thermoplastic), municipal solid waste, or any of a variety of material sources. In some embodiments, the waste may include paper and thermoplastic articles. In some embodiments, the plastic is 1%-99% polyethylene, 1%-99% polypropylene, and/or 1%-99% other polymers including but not limited to polyester (PET), ABS, PVC, and Nylon. In some embodiments, the plastic comprises composite materials including polypropylene coated polyester fibers or low-density polyethylene film laminated to PET film. The waste materials can be received from any landfill site or other source of waste or may be purchased from commercial stores.

In operation 112, the manufacturing system can separate cellulose and plastic from the waste materials. The manufacturing system can separate cellulose and plastic from the waste materials using a separator that can identify cellulose and plastic from a stream of waste and remove (e.g., via sorting equipment) the separated cellulose and plastic from the waste. In some embodiments, a vibratory screen can be used for size separation, a wind sifter can be used for density separation, magnets can be used for metal separation, etc.

In operation 114, the manufacturing system can shred or refine the separated cellulose and plastic to one or more targeted sizes. The manufacturing system can use a variety of methods to shred and/or refine the received waste materials to a targeted size. Screens can be used to isolate fragments that have the targeted size from fragment mixtures that have a range of sizes. The manufacturing system can separately shred the cellulose and the plastic such that the paper and plastic may have different dimensions. As described below, using different shredding sizes may enable the manufacturer to create finished goods for different applications. In some embodiments, a targeted size for the plastic or cellulose waste can each be from 2 μm to 50 mm. In some embodiments, shredders, separators, sifters, flakers, granulators, hammer mills, attrition mills, roller mills, and a variety of other mechanisms may be used to achieve converted waste fragments that have such a targeted dimension. In one example, paper contained in the received waste materials can be converted to fragments that have a size of 12 mm while plastic contained in the received waste materials can be converted to fragments that are larger than the paper fragments. The manufacturing process may be designed to convert all the waste to fragments of a preferred size or, alternatively, the manufacturing process may be designed to separate out a particular component and convert that component to a preferred size. For example, prior to sizing any of the waste, the manufacturer may separate out paper from the rest of the materials and convert the paper to a desired size, such as 12 mm. The manufacturer may additionally or instead separate the plastic from the rest of the materials and convert the plastic to a desired size, such as 24 mm.

In some embodiments, the manufacturing process can include selecting a size ratio of the materials based on the product the manufacturer is creating. For example, the manufacturer may have specification sheets (e.g., paper sheets that contain information for different finished products) for different products depending on the desired application (e.g., roofing in a hot climate, roofing in a cold climate, roofing in a humid climate, side paneling, etc.). Each specification may include a different cellulose to plastic size ratio. While the shape of the product may remain the same between products manufactured using the different specification sheets, the desired performance properties (e.g. a target modulus of rupture (MOR), a target modulus of elasticity (MOE), a target interlaminate bond strength, a target flexural strength, a target impact resistance, a target density, a target density, etc.) may differ depending on the application. For example, climates in which there is a significant amount of rain or sleet may call for size ratios that result in more malleable (e.g., higher MOE) roofing products to avoid permanent dents while climates in which the weather is relatively constant with little or no rain or snow may call for more rigid (e.g., lower MOE) roofing. Such rigidity levels may be controlled by the size and/or the size ratio of the paper and plastic fragments after the paper and plastic are shredded. In one example, the manufacturer can select the target cellulose to plastic ratio based on a target quantity and particle size of fines that are generated during the shredding of the cellulose and the plastic.

Accordingly, to determine which sized shredders to use to manufacture a product, the manufacturer may review the specification sheets for the different products. The manufacturer may identify the ratios and/or sizes from the specifications that corresponds to the desired applications (e.g., that correspond to one or more desired properties or applications). The manufacturer may then adjust the sizes of the shredders (e.g., adjust the sizes of the holes in the mesh of the shredders that respectively shred the paper and plastic) according to the specified sizes or ratios to reach any specified performance properties.

In some embodiments, the manufacturer may adjust the shredding size of the shredders by changing or exchanging the mesh that is in the respective shredder. For instance, the manufacturer may retrieve a mesh with holes that match the size specified in the specification for the product and insert the mesh into the shredder such that any cellulose or plastic fragments that come out of the mesh are less than or equal to the size of the holes. For example, if a specification for a finished product calls for paper or cellulose fragments that are less than 12 millimeters and plastic fragments that are less than 34 millimeters, the manufacturer may retrieve a mesh with holes that are 12 millimeters in size and a mesh with holes that are less than 34 millimeters in size. The manufacturer may then insert the mesh into the corresponding shredders to shred the paper and the plastic into the sizes identified in the specification. In another example, a specification for a finished product may call for a paper or cellulose to plastic size ratio of 1:2. In this example, the manufacturer may retrieve and insert meshes that match the size of the ratio (e.g., a 12 millimeter sized mesh and a 24 millimeter sized mesh). Examples of the different sizes of mesh that can be inserted into the cellulose shredder and/or the plastic shredder include, but are not limited to, 34 millimeters, 19 millimeters, 15 millimeters, and 12 millimeters. Thus, the manufacturer can change the sizes of the shredders (e.g., replace the mesh in the shredders with different sized holes) depending on the product the manufacturer is creating such that the manufacturer may manufacture products for different applications over time without otherwise changing the manufacturing process (e.g., without introducing new steps or materials to the process).

In some embodiments, waste materials are separated into groupings or sections based on a variety of different parameters, depending on the preferences of the manufacturer. For example, as described above, such separation can be performed using sifters, magnets, and other types of separating machinery. In some embodiments, the shredded materials remain separate and are stored in a storage vessel (e.g., a metal, wooden, or plastic container configured to store materials) after they are shredded. The shredded material can remain in the storage vessel for a period of 1 minute to 1 day at a temperature of between about 50-120 degrees Fahrenheit. The additional storage time can be especially beneficial if the fragments are treated with a chemical that modifies the fragments. For instance, the fragments might be treated with a multifunctional aldehyde that crosslinks endotoxin. The additional storage time can help to ensure that the crosslinking reaction is complete before proceeding with other processing steps. It can be especially helpful to remove excess moisture from the fragments after storage. This can be achieved by processing the stored fragments through a dryer. The act of removing excess moisture is particularly helpful to achieve proper hot-pressing of the fragments and conversion to a finished good. By removing excess moisture from the shredded material, the finished good may be more likely to accurately reflect the characteristics described in the specification for the finished good (e.g., the desired characteristics). In some embodiments, the shredded plastic and shredded cellulose may be stored in separate storage vessels and then blended together at a specific targeted mix ratio.

In an operation 116, the manufacturing process can include selecting a cellulose to plastic ratio from a plurality of cellulose to plastic ratios. Similar to selecting the size of the shredders to use to shred the cellulose and the plastic, the cellulose to plastic ratio may be selected from a plurality of cellulose to plastic ratios that are identified in specifications for products that can be used for different applications. For example, a product that can be used for roofing in a warm dry environment may require a different cellulose to plastic ratio than a product that can be used for roofing in a cold wet environment. The manufacturer can select a specification depending on the desired application of the product, identify the target cellulose to plastic ratio from the specification, and set the cellulose to plastic ratio in the manufacturing system. In one example, a controller may operate the manufacturing system to manufacture the finished good. In this example, a user may manually input the set target cellulose to plastic ratio based on the specification and the controller can operate the manufacturing system to cause the finished product to have the set ratio.

In some embodiments, the manufacturer can select the target cellulose to plastic ratio based on desired characteristics of the finished product that is being generated. The manufacturer can store specifications for different desired characteristics of finished products that may include target cellulose and plastic sizes and/or size ratios and/or target cellulose to plastic ratios. The manufacturer can select the specification that includes the desired characteristics, identify the target cellulose and plastic sizes and/or size ratios and/or target cellulose to plastic ratios, and configure the system to create a finished product with the identified target cellulose and plastic sizes and/or ratios and/or target cellulose to plastic ratios.

For instance, the separate material streams can include a paper fragment stream and a plastic fragment stream. The material from the material streams can be mixed together to form a mixed stream with a ratio of about 70/30 to 50/50 (paper/plastic) or any other ratio depending upon the specification of the desired characteristics of the finished product. For example, the manufacturer can select the target cellulose to plastic ratio based on a target internal bond strength, a target peel resistance, and/or a target wind uplift resistance of the finished good. In another example, the manufacturer can select the target cellulose to plastic ratio based on a target performance property (e.g., MOR, MOE, interlaminate bond strength, flexural strength, impact resistance, target density, etc.). In yet another example, the manufacturer can select the target cellulose to plastic ratio based on a target water absorption property or target moisture movement and thermal movement of the finished good. In yet another example, the manufacturer can select the target cellulose to plastic ratio based on a target finished good formulation (e.g., desired layer material makeup). In yet another example, the manufacturer can select the target cellulose to plastic ratio based on a target layer height or thickness of the finished good. In some embodiments, the manufacturer may similarly select the target cellulose and plastic sizes and/or size ratios in operation 112 based on the same desired or target characteristics to configure the mesh sizes of the shredders or any other mechanism to size the different materials.

In an operation 118, the shredded cellulose and plastic may be metered according to the selected ratio. In an operation 120, the shredded cellulose and plastic may be metered using a device that can measure amounts of material that are being picked up. The manufacturing system may retrieve the shredded cellulose and plastic from their separate streams according to the selected cellulose to plastic ratio and comingle the metered materials into a single mixed stream. The manufacturing system may meter the material by retrieving a predetermined amount of material according to the selected ratio. In some embodiments, the system can comingle the materials immediately (e.g., without placing them in any other storage components) after the respective material is shredded. In some embodiments, the system may retrieve and comingle the materials from the materials' separate storage vessels after the material has been stored to remove excess liquid on the materials.

In some embodiments, the mixed stream may be organized into a blended mat or layer depending on the cover board being manufactured. In some embodiments, the manufacturer may configure blended mats to have a height of between 1 to 24 inches tall and between 36 to 192 inches wide. The height of the mat can be controlled by manipulating bulk density of the mat through changes in material sizes, as described herein. In some embodiments, the mixed stream may be organized into a blended mat that has two or more separated layers. The layers may be arranged such that each layer has materials of different sizes, different material ratios, or a combination of different material ratios and sizes from each other. For instance, one layer may have 12 mm paper fragments, 24 mm plastic fragments, and a material ratio of 1/2 (paper/plastic) while another layer may have 18 mm paper fragments, 30 mm plastic fragments, and a material ratio of 1/1 (paper/plastic). The blended mat may have any number of layers with any number of different material ratios, material sizes, and/or combinations of material ratios and sizes. Each layer configuration may be identified from the specification from which the material sizes, size ratio, and/or material ratio was selected.

In some embodiments, to organize the mixed stream into a blended mat, the manufacturer may uniformly distribute and shape the metered materials into a mat. For example, the manufacturer may mix the materials such that different segments of the mat have the same cellulose to plastic ratio as each other and the mat has a pattern or shape (e.g., a rectangle or square) that is identified in the specification. The manufacturer may mix the materials to have any ratio and any shape.

In some embodiments, material may be added to the mixture of paper fragments and plastic fragments. In some embodiments, the added material may improve the finished goods elasticity or other performance characteristics of the finished good. In some embodiments, the added materials might aid in processing the mixture of paper fragments and plastic fragments. In some embodiments, adding such material may reduce the materials that are needed to create a finished good because less material is wasted or disposed of during the manufacturing process. For example, the manufacturer may collect any fines or dust that is generated during the manufacturing process and add the fines or dust to the blended mat. In some cases, the fines or dust that are added to the mat comprise 0% to 15% of the finished good by weight. In another example, the manufacturer may add powdered polymers to the shredded cellulose of the mat. The powdered polymers may be sized or refined to sizes between 2 and 150 µm and comprise 2% to 15% of the finished good by weight.

In operation 122, the blended mat may be consolidated into a finished good. The blended mat may be consolidated into a finished good using heat and pressure (e.g., by pressing the blended mat using hot platens at a set pressure). In some embodiments, the blended mat may be formed into the finished good by heating the blended mat to temperatures exceeding about 220 F, 250 F, or 300 F, depending on the application of the finished good. Such temperatures may be outlined in the specification that was used to select the shred size/or ratio and cellulose to plastic ratio. In some embodiments, subsequent to heating the mat, the consolidated mat may be cooled at a similarly defined temperature (e.g., by pressing the heated blended mat using cold platens at a set pressure). In some embodiments, the finished good may be a roof cover board, as is described herein. A more detailed description of how the blended mat is formed into a finished product using heat and/or cold and pressure is described in U.S. patent application Ser. No. 17/171,766.

In some embodiments, the manufacturing process may include, prior to shredding the separated cellulose and the separated plastic: separating the waste materials or first use materials by type, size, and/or shape; separating the waste materials or first use materials by density; separating the waste materials or first use materials by chemical composition; and separating ferrous and nonferrous metals from the waste materials or first use materials. The manufacturing process may further include, subsequent to shredding the separated cellulose and the separated plastic: reducing biological activity of the sized materials. In some embodiments, forming a blended mat involves organizing the metered shredded cellulose and plastic into a single layer or a multilayer mat.

A roof cover board with facer layers and bonding layers, such as the board described with reference to FIG. 2, can receive materials for a core layer and layers for the facer layers and bonding layers according to the desired content of those layers. Similarly, a roof coverboard with thermosetting resin, such as the board described with reference to FIG. 3, receives materials for unresinated layers and resinated layers in addition to layers for the core layer, facer layers, and bonding layers. An impact resistant board, such as the board described with reference to FIG. 4, receives materials for an impact resistant layer in addition to the core layer. In operation 120, the manufacturing process forms the cover board. Performance properties, water absorption, and mechanical properties of the cover board can be manipulated through changes in material size and ratios of materials. Mechanical properties can include modulus of rupture, modulus of elasticity, flexural strength, and impact resistance. Physical properties can include internal bond strength, peel resistance, and wind uplift resistance of the finished good and can be manipulated through changes in material size and ratios of materials. Moisture movement and thermal movement properties of the resulting finished good also can be manipulated through changes in material size and ratios of materials.

In various embodiments, powdered polymers sized 2-150 µm are added to cellulose fragments at a rate of 2%-15% by weight. The mechanical properties of finished goods produced using 2-150 µm powered polymers and cellulose fragments are equal to or greater than finished goods produced from 12-34 mm cellulose and plastic fragments at a ratio of 70% cellulose to 30% plastic. Also in various embodiments, materials of similar size are arranged as a top and bottom layer, similar sized materials that are larger or smaller than the top and bottom layer are arranged as a core layer. The materials of the top and bottom layer can be plastic and cellulose fragments ranging in size from 12 mm to 34 mm. The materials of the core layer can be plastic and cellulose fragments ranging in size from 12 mm to 34 mm. The materials of the top and bottom layers can have a cellulose to plastic ratio of between 2%:98% and 98%:2%. The materials of the core layer can have a cellulose to plastic ratio of between 2%:98% and 98%:2%. In some embodiments, the materials of the core layer have a cellulose to plastic ratio of between 2%:98% and 98%:2%. The top and bottom layers are 5% to 95% of the total thickness of the finished good and the core layer is 5% to 95% of the total thickness of the finished good.

Figure 1B:
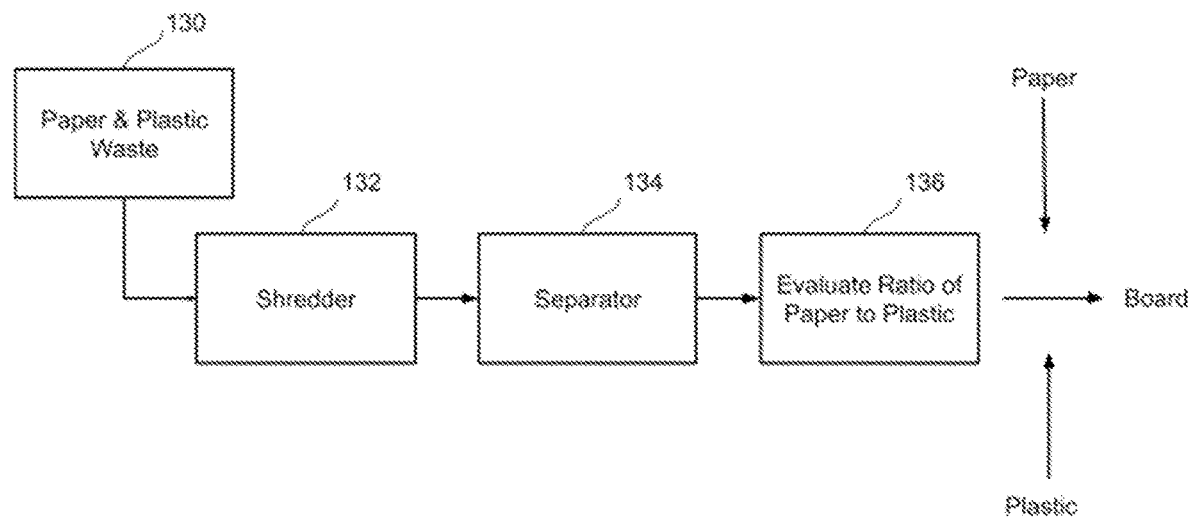
FIG. 1B is a flow diagram depicting operations in a cover board manufacturing process, in accordance with another example embodiment.

FIG. 1B illustrates a flow diagram depicting operations performed in another example cover board manufacturing process. The operations depicted include receiving paper and plastic waste or first time use paper and plastic (130), one or more shredding processes (132), one or more separator processes (134), an evaluation of the paper to plastic ratio (136), balancing of paper and/or plastic by adding or removing paper and/or plastic, and manufacturing the cover board.

In operation 130, paper and plastic waste can include municipal solid waste (MSW), materials recovery facility (MRF) residuals, single stream recycling, industrial waste, and/or other materials. Paper and plastic waste can also be first use paper and plastic. Operation 132 can include multiple shredding operations. For example, an auger separator that removes oversized materials can be used. Shredders can be used to reduce material sizes to 10 inches in any direction or smaller. Separation can also include the use of a ferrous magnet to remove ferrous materials from the stream.

Similarly, operation 134 can include multiple separation operations. The separation operation(s) remove materials approximately 2 inches in any direction or greater. A vibratory screen can be used for size separation, a wind sifter can be used for density separation, magnets can be used for metal separation, etc. In some embodiments, the screen has a mesh size of 34 mm or less, 19 mm or less, 15 mm or less, or 12 mm or less. In some embodiments, waste materials can be refined to a size of about 10" or less using a screen with a mesh size of 10" or less. The wind sifter uses high velocity air to separate heavy materials from light materials. For example, the wind sifter may be configured to separate fragments that were generated from the vibratory screen that has a density below a threshold. The light materials continue through the process while the denser materials may be removed. Another separation operation involves the materials passing over an Eddy Current where non-ferrous materials, such as brass, aluminum, and bronze, are removed and discarded. Yet still another separation operation involves materials passing through near infrared separators that remove materials considered to be contaminates, yielding streams of mostly paper or plastic.

A dielectric method may be used in operation 136 to evaluate the ratio of paper to plastic in the remaining stream after the shredding and separating operations. Before entering the board making process, the paper to plastic ratio may be adjusted with streams of clean paper and/or plastic. Alternatively, some processes may involve adjusting the paper to plastic ratio by removing selective amounts of paper and/or plastic. The paper to plastic ratio is optimized as further discussed below.

Figure 1C:
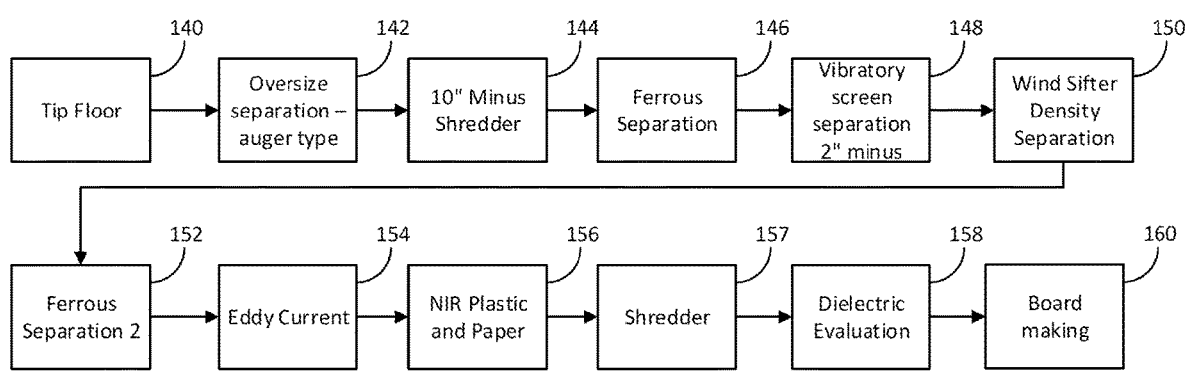
FIG. 1C is a flow diagram depicting operations in a cover board manufacturing process, in accordance with yet another example embodiment.

FIG. 1C illustrates a flow diagram depicting operations performed in another example cover board manufacturing process. The operations depicted include a tip floor operation (140), oversize separation using an auger (142), shredding to 10" or less (144), a ferrous separation (146), a vibratory screen separation (148), a density separator (150), a ferrous separation (152), an eddy current operation (154), an NIR plastic and paper assessment (156), a shredding operation (157), a dielectric evaluation (158), and a board making operation (160).

In the tip floor operation 140, waste is unloaded and staged for loading into processing equipment. Waste may be unloaded from trucks using end loaders or other heavy equipment. In operation 142, an auger is used to separate oversized materials from the waste provided from the tip floor. Shredders then reduce the waste to portions of 10" or smaller in operation 144. A Metso shredder is an example of a shredder that can be used for such a purpose, any shredder may be used. Ferrous separation in operation 146 can be carried out using electromagnets or industrial sized magnets.

Further separation of the materials is carried out in operation 148 with a vibratory screen and in operation 150 with a density separator. A second ferrous separation is done in operation 152 and another separation is done using a localized electric current induced in a conductor to produce an eddy current in operation 154. A near infrared (NIR) device is used to assess plastic and paper content in operation 156. In operation 157, the material may be shredded after the assessment via one or multiple shredders that are dedicated to the different materials (e.g., shredders that have different mesh sizes for cellulose and plastic according to a selected ratio or size). A dielectric evaluation can be done in operation 158 using a device to measure a dielectric constant in materials. After the plastic and paper content is determined and dielectric measured, a board is made in operation 160.

Figure 1D:
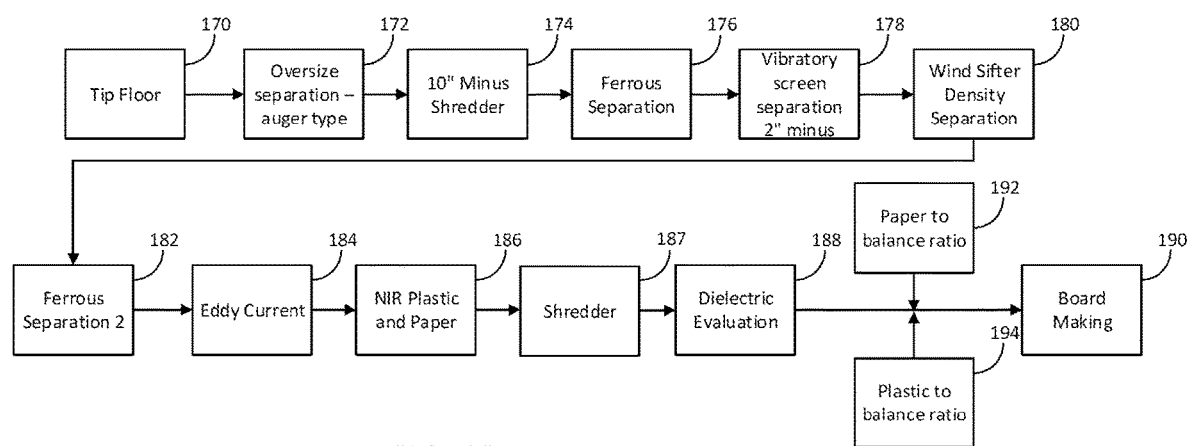
FIG. 1D is a flow diagram depicting operations in a cover board manufacturing process, in accordance with yet still another example embodiment.

FIG. 1D illustrates a flow diagram depicting operations performed in another example cover board manufacturing process. The operations depicted include a tip floor operation (170), oversize separation using an auger (172), shredding to 10" or less (174), a ferrous separation (176), a vibratory screen separation (178), a density separator (180), a ferrous separation (182), an eddy current operation (184), an NIR plastic and paper assessment (186), a shredding operation (187), a dielectric evaluation (188), a board making operation (190), a paper to balance ratio adjustment (192), and a plastic to balance ratio adjustment (194).

Operations 170-190 in FIG. 1D are similar to operations 140-160 described with reference to FIG. 1C. In operation 192, an adjustment to the amount of paper is made to the material stream to achieve a desired balance ratio (a target paper to plastic ratio identified in a specification). For example, paper fragments can be added or removed from the material stream to have a higher or lower paper content. Similarly, in operation 194, an adjustment to the amount of plastic is made to the material stream to achieve a desired balance ratio. For example, plastic fragments can be added or removed from the material stream to have a higher or lower plastic content. Accordingly, the system may correct any metering or measuring errors that the system may have made when after mixing the shredded paper and plastic together.

Figure 1E:
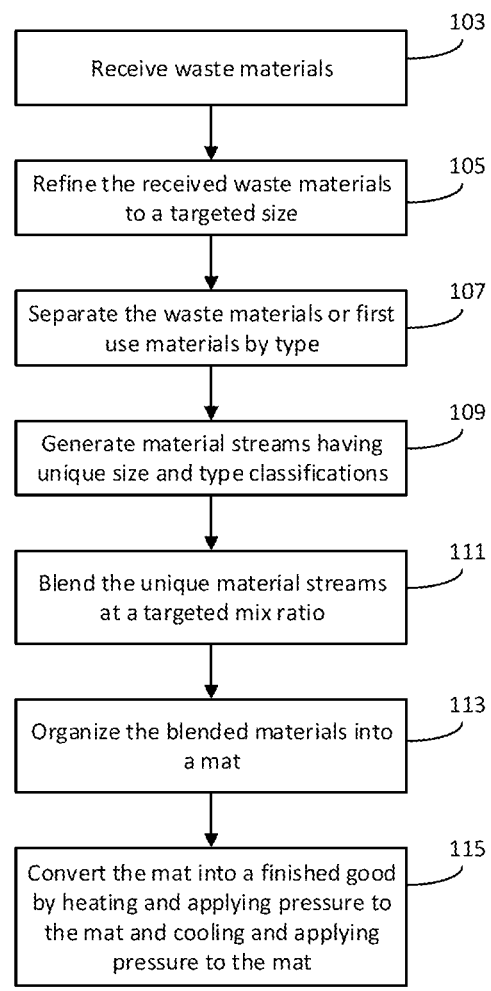
FIG. 1E is a flow diagram depicting operations in a cover board manufacturing process, in accordance with yet still another example embodiment.

FIG. 1E illustrates a flow diagram depicting operations performed in another example cover board manufacturing process. The operations depicted include receiving waste materials or first use materials (103); refining the received waste materials to a targeted size (105); separating the waste materials or first use materials by type (107); generating material streams having unique size and type classifications (109); blending the unique material streams at a targeted mix ratio (111); forming the blended materials into a mat (113); and consolidating the mat into a finished good by heating and applying pressure to the mat, and cooling and applying pressure to the mat (115).

Figure 1F:
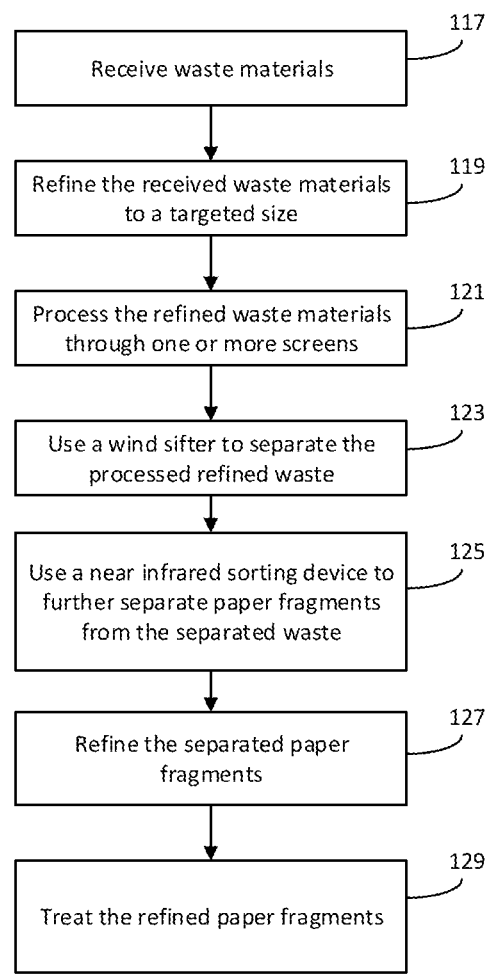
FIG. 1F is a flow diagram depicting operations in a fragment manufacturing process, in accordance with yet still another example embodiment.

FIG. 1F illustrates a flow diagram depicting operations performed in an example fragment manufacturing process. The operations depicted include receiving waste materials or first use materials (117); refining the received waste materials to a targeted size (119); process the refined waste materials through one or more screens (121); use a wind sifter to separate the processed refined waste (123); use a near infrared sorting device to further separate paper fragments from the separated waste (125); refine the separated paper fragments (127); and treat the refined paper fragments.

Operation 117 may be similar to operations 112 and/or 130 above. In operation 119, a manufacturer may refine received waste materials to a size of about 10" or less. The manufacturer may do so using a shredder with a mesh size of about 10" or less. In operation 121, the manufacturer may process the refined waste materials using shredders with one or more screens with a mesh size between about 2" and 10". Accordingly, the manufacturer may create a set of fragments from the waste materials that have a size between about 2" and 10". In operation 123, the manufacturer may use a wind sifter to separate a subset of the set of fragments based on the density of the different fragments. For example, the manufacturer may configure the wind sifter to separate a subset of fragments from the set of fragments responsive to the subset of fragments having a density below a threshold. In operation 125, the manufacturer may use a near infrared sorting device to further separate paper fragments from the subset of fragments using a near infrared sorting device. The manufacturer may do so while partially or wholly excluding plastic fragments from the subset. In some embodiments, the manufacturer may use the near infrared sorting device additionally or instead separate plastic. The manufacturer may do so while partially or wholly excluding paper fragments from the subset. In operation 127, the manufacturer may refine the separated fragments to a size of about 50 mm or less. The manufacturer may do so using a shredder with a mesh size of 50 mm or less. Advantageously, by using a series of refining, sorting, and processing operations to incrementally shred or process waste materials into fragments, the manufacturing system may encounter fewer processing errors as the manufacturing system may not attempt to shred items that are too big or too dense to shred for the shredders.

In operation 129, the manufacturer may treat the refined fragments (e.g., paper or plastic fragments). In some embodiments, the manufacturer may treat the refined fragments using one or more multifunctional aldehydes or a treatment composition derived from urea and one or more multifunctional aldehydes. In some embodiments, the manufacturer may treat the refined paper fragments using one or more antimicrobial agents.

In some embodiments, the process may include removing metal from the waste materials using one or more metal removal devices. In some embodiments, the process may include treating the fragments with multifunctional aldehydes or mixtures of urea and multifunctional aldehyde prior to storing the paper fragments and the plastic fragments in a storage vessel for a period between about 1 minute to 1 day at a temperature of between about 50-120° F. In some embodiments, the process may include removing moisture from the waste materials after a storage period. Treating the refined separated paper and/or plastic fragments may include curing or removing residual multifunctional aldehyde or treatment composition to yield paper and/or plastic fragments that have a moisture content less than about 10%.

In some embodiments, the process may include refining the separated plastic fragments to a size of about 50 mm or less; and treating the refined separated plastic fragments with one or more multifunctional aldehydes or a treatment composition derived from urea and one or more multifunctional aldehydes.

In some embodiments, the process may include refining the separated paper fragments with a shredder having a screen with a mesh size of 25 mm or less. In some embodiments, the process may include refining the separated paper fragments with a shredder having a screen with a mesh size of 19 mm or less. In some embodiments, the process may include refining the separated paper fragments with a shredder having a screen with a mesh size of 15 mm or less.

In some embodiments, the process may include refining the separated paper fragments with a shredder having a screen with a mesh size of 12 mm or less. In some embodiments, the multifunctional aldehyde is glutaraldehyde. In such embodiments, treating the refined separated paper fragments may include applying the glutaraldehyde at an application level of between 50-5,000 ppm based on a dry weight of the refined paper fragments. In some embodiments, the treatment composition is derived from urea and glutaraldehyde. In some embodiments, the treatment composition is derived from urea and glutaraldehyde, which are combined at a ratio of 1-20 parts urea (by weight) per 1 part glutaraldehyde (by weight).

In some embodiments, the treatment composition is derived from urea and glutaraldehyde, which are combined at a ratio of 1-20 parts urea (by weight) per 1 part glutaraldehyde (by weight). Treating the refined separated paper fragments may include applying the treatment composition at an application level of between about 50-50,000 ppm based on the dry weight of the treatment formula and the dry weight of the paper fragments. In some embodiments, refining the paper fragments causes the paper fragments to have an endotoxin level that is less than about 5,000 ng per gram of paper fragment.

In some embodiments, the processes described in FIGS. 1A-1F are performed using a controller that controls a manufacturing system. For example, a manufacturer may have a controller that includes a processor and memory and that is in communication (e.g., via a network interface) with different manufacturing components of a manufacturing system designed to create finished goods using waste and first use materials. The controller may store instructions in memory that enable the controller to control the different manufacturing components according to input conditions that are provided by an operator. For example, via a user interface, an operator may select a finished good (e.g., a product designed for a particular application or one or more target performance characteristics) from a displayed list of finished goods or target performance characteristics. The controller may identify the selection and retrieve a stored specification (e.g., a file or spreadsheet containing characteristics for a finished product) from memory that corresponds to the selected finished good or target performance characteristics. The controller may identify characteristics from the selected specification and use the identified characteristics to select fragment sizes/ratios and/or fragment material ratios as described with reference to FIG. 1A. The controller may then control the separators and shredders or sizers of the manufacturing system to cause a finished product to be created according to the selected specification. Thus, the controller may use stored specifications to generate finished products for a variety of applications.

In some embodiments, the target cellulose to plastic ratio can be selected from a separate specification from the specification that the manufacturer used to select the specification for the material size and/or size ratio. For example, if the manufacturer is controlling the process using a controller, the controller may first identify a specification in one file based on one set of desired characteristics to identify a target material size and/or size ratio and then identify a specification in a second file based on another set of desired characteristics to identify a target cellulose to plastic ratio. Thus, the manufacturer may have a finer grain control over the characteristics of the finished products that are being created without requiring the memory resources to store specifications for every permutation of performance characteristics.

Figure 2:
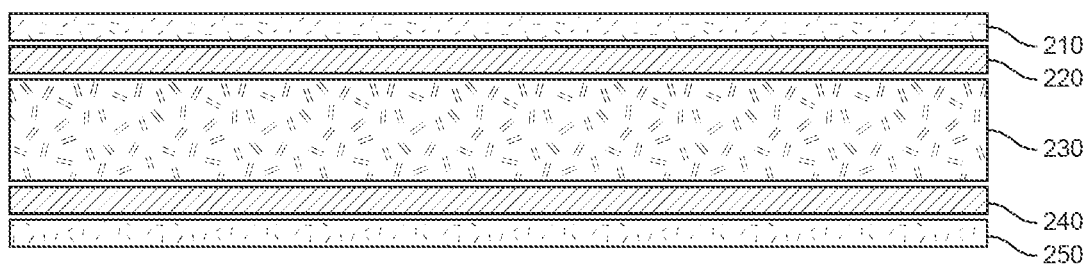
FIG. 2 is a side cutout view of an example cover board including layers manufactured in accordance with an example embodiment.

FIG. 2 illustrates a roof cover board having a top facer 210, a bonding layer 220, a core 230, a bonding layer 240, and a bottom facer 250. The top facer 210 and bottom facer 250 may be of the same material, but do not have to be. Similarly, bonding layer 220 and bonding layer 240 may be of the same material, but do not have to be. Core 230 includes waste materials, or first use materials processed according to the operations described with reference to FIG. 1A or 1B. In an example embodiment, core 230 includes paper shreds having a size equal to or less than 25 mm. In a preferred embodiment, core 230 includes paper shreds of 12 mm size. Core 230 also includes plastic shreds having a size equal to or less than 25 mm.

Figure 3:
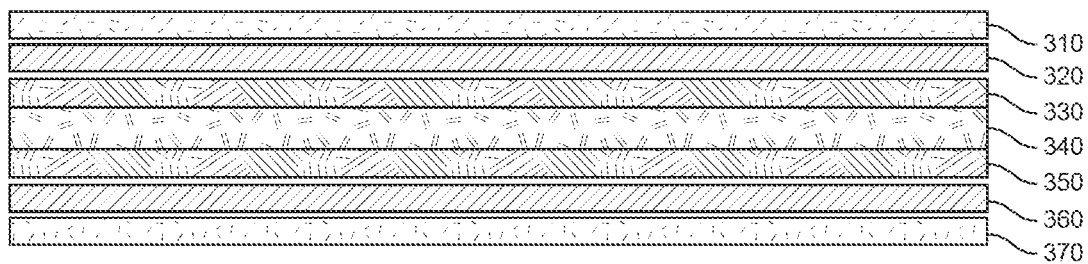
FIG. 3 is a side cutout view of another example cover board with thermosetting resin manufactured in accordance with an example embodiment.

FIG. 3 illustrates a roof cover board having a top facer 310, a bonding layer 320, an unresinated core 330, a resinated core 340, an unresinated core 350, a bonding layer 360, and a bottom facer 370. Similar to the cover board of FIG. 2, the top facer 310 and bottom facer 370 may be of same material but do not have to be. Bonding layer 320 and bonding layer 240 may be of the same material but do not have to be.

Figure 4:
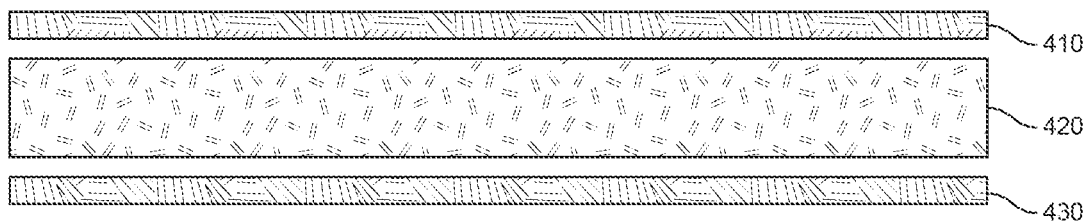
FIG. 4 is a side cutout view of yet another example cover board with an impact resistant layer manufactured in accordance with an example embodiment.
Figure 5:
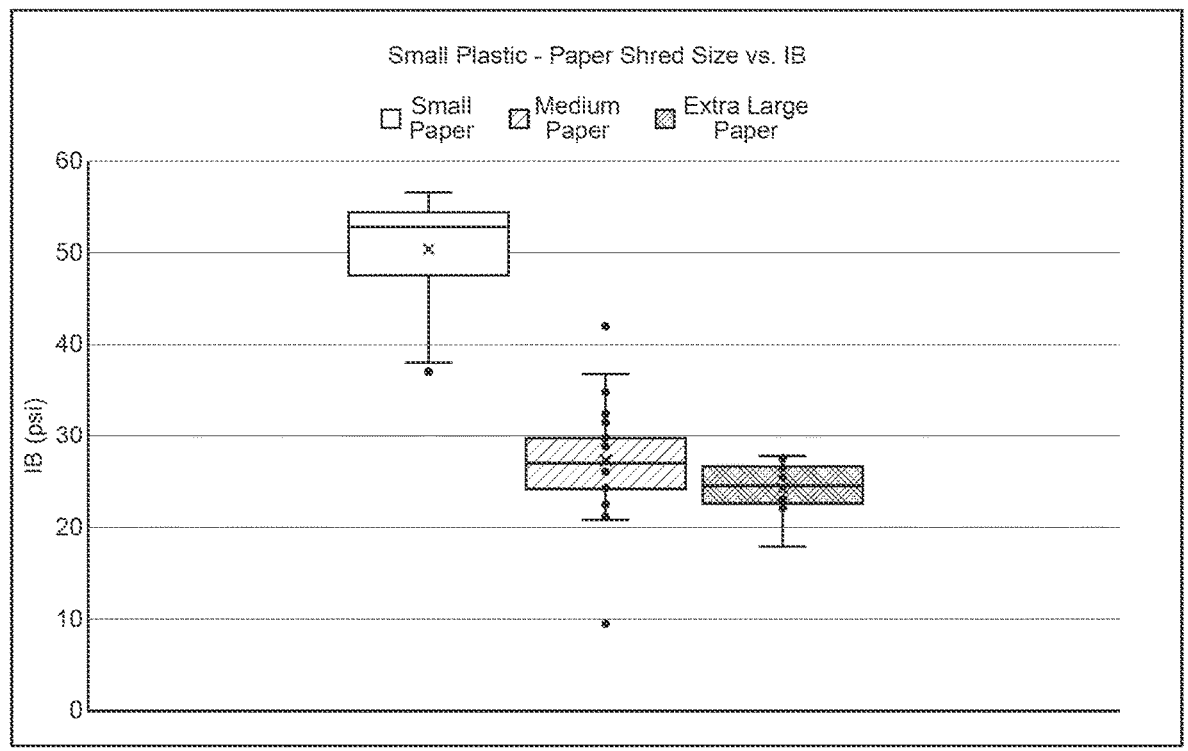
FIG. 5 is a graph depicting internal bonding (IB) values for small plastic and varying paper shred size.
Figure 6:
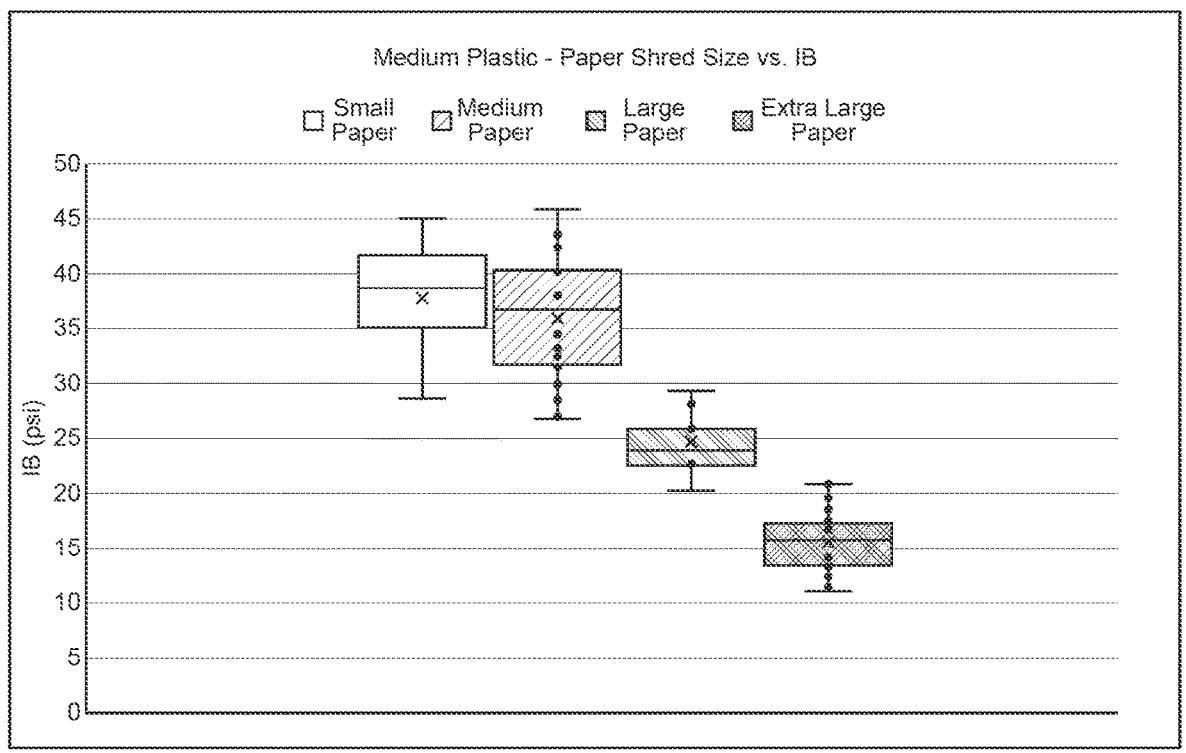
FIG. 6 is a graph depicting IB values for medium plastic and varying paper shred size.
Figure 7:
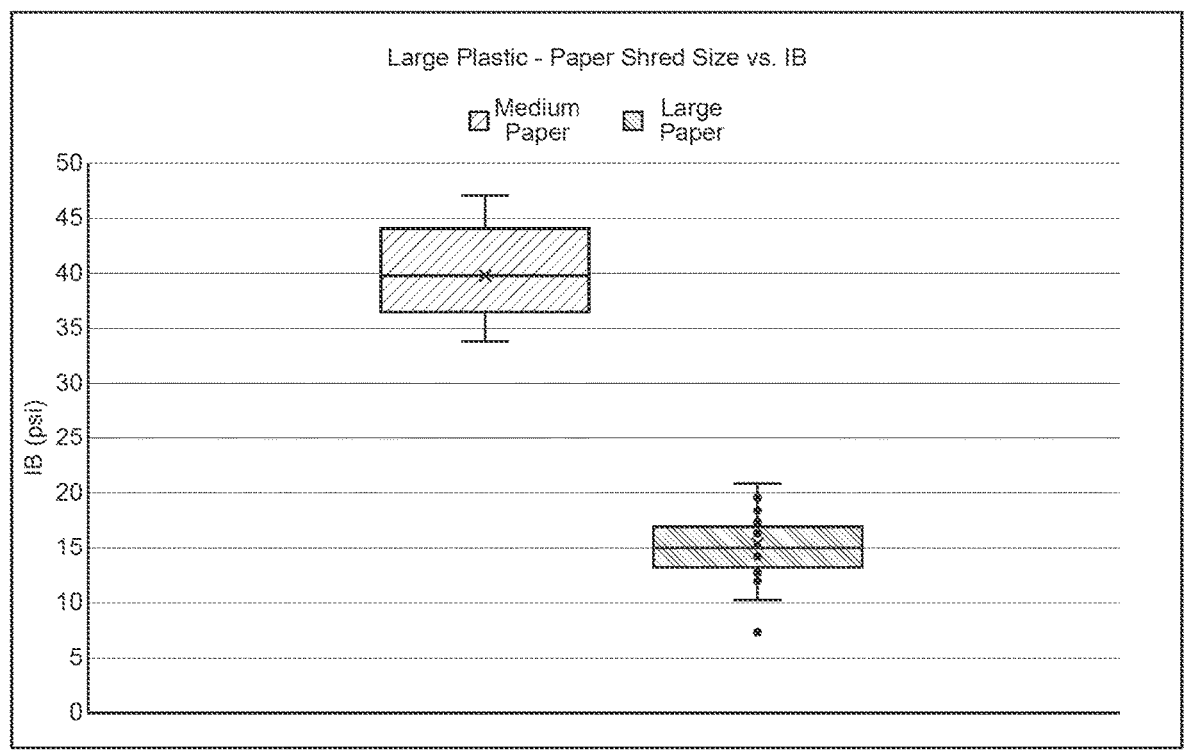
FIG. 7 is a graph depicting IB values for large plastic and varying paper shred size.
Figure 8:
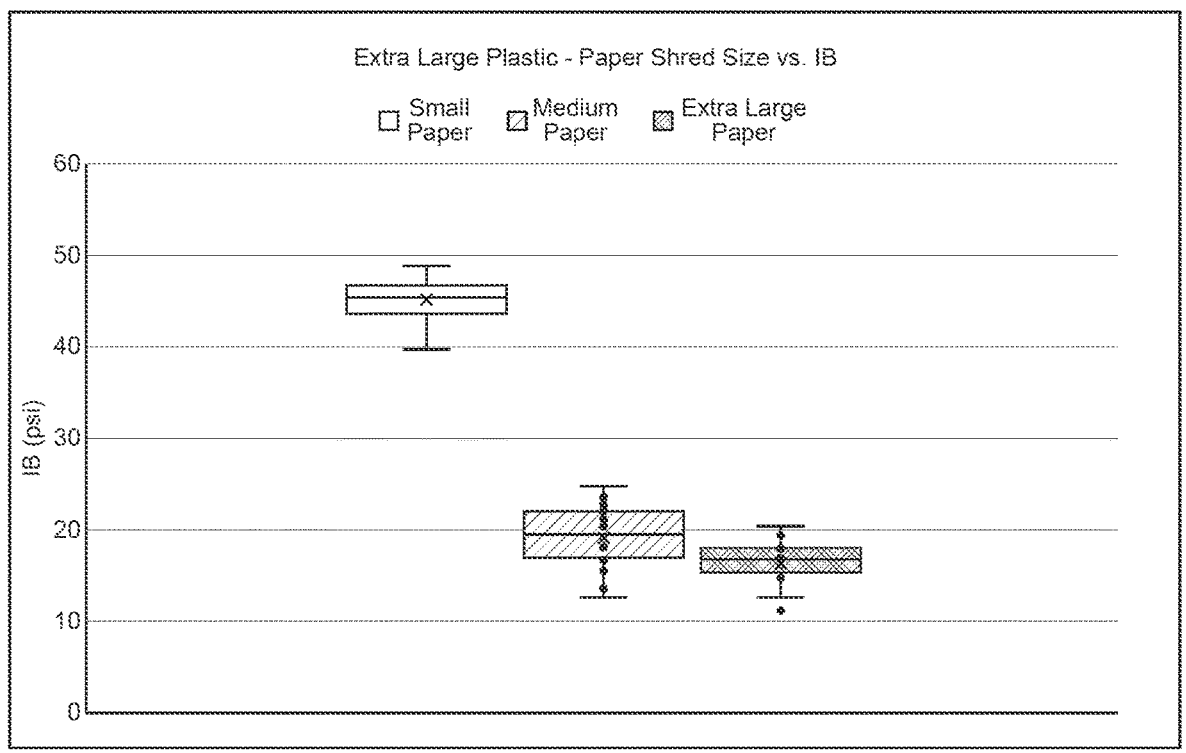
FIG. 8 is a graph depicting IB values for extra large plastic and varying paper shred size.
Figure 9:
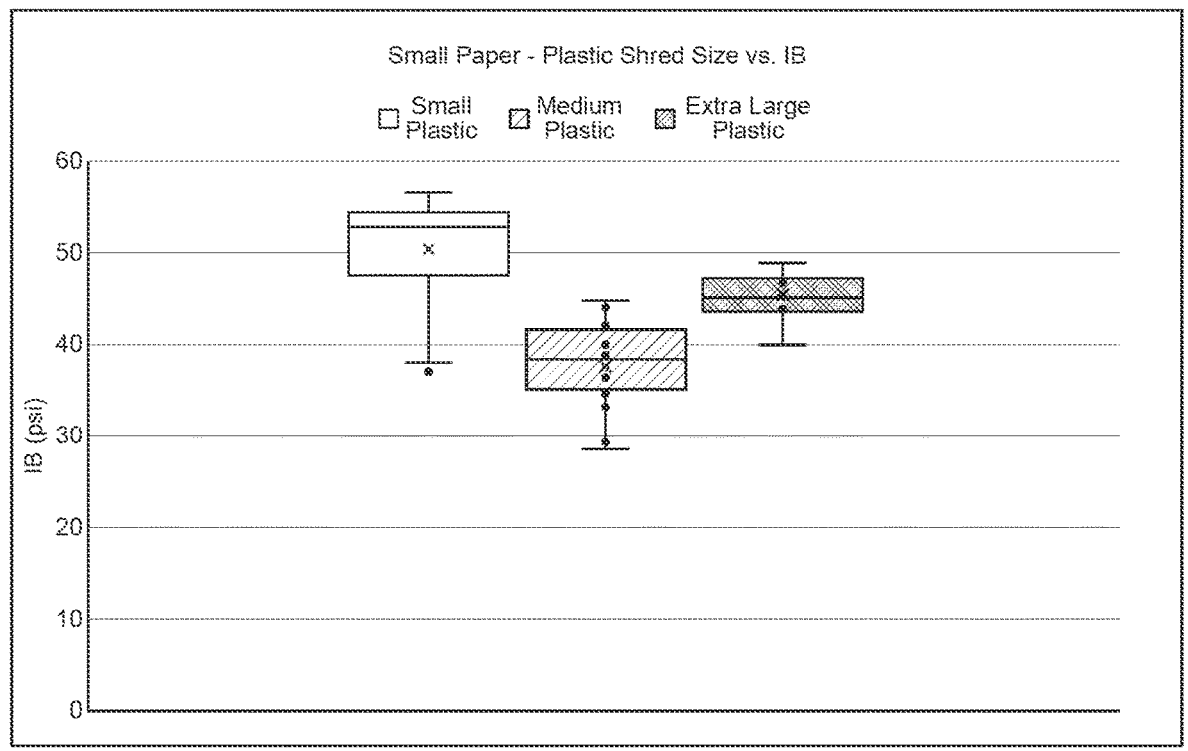
FIG. 9 is a graph depicting IB Values for small paper and varying plastic size.
Figure 10:
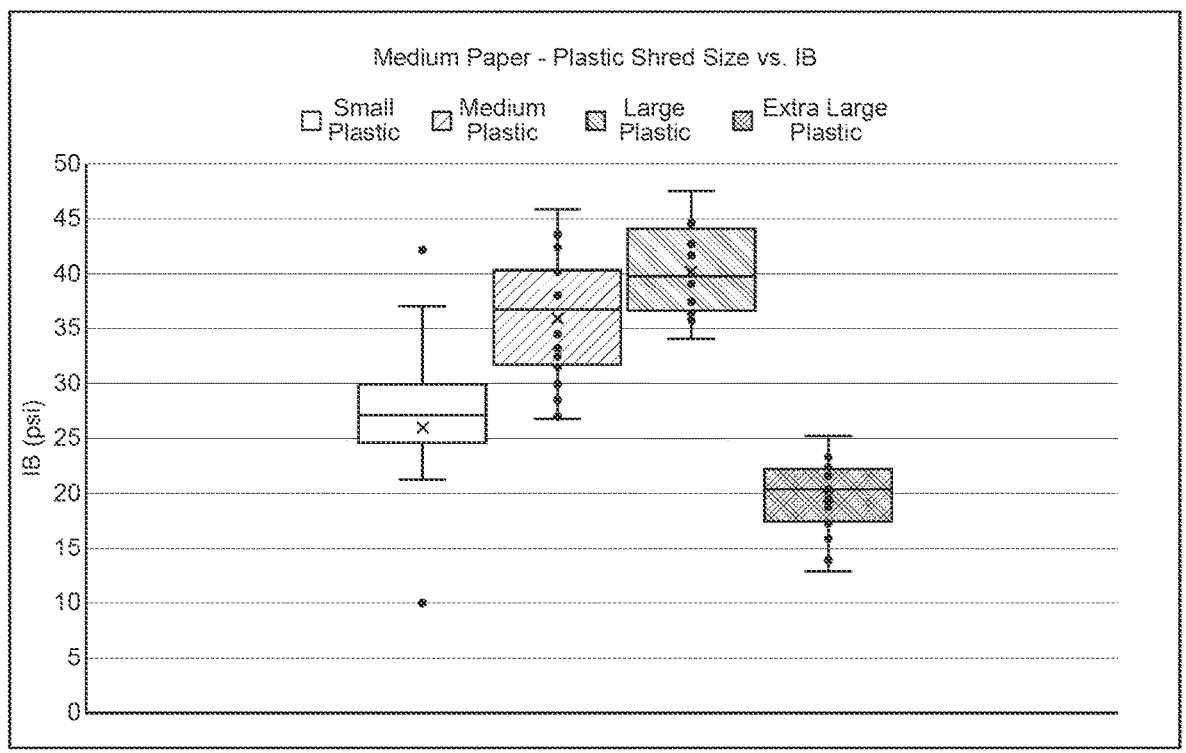
FIG. 10 is a graph depicting IB Values for medium paper and varying plastic size.
Figure 11:
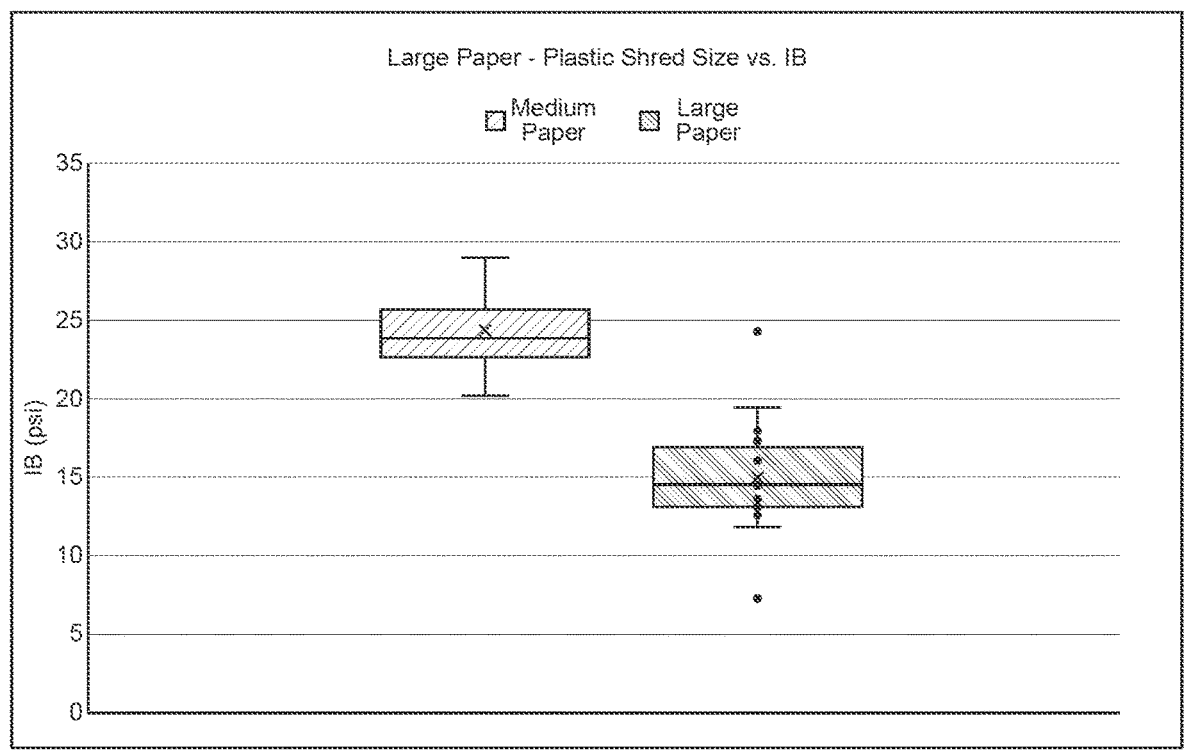
FIG. 11 is a graph depicting IB Values for large paper and varying plastic size.
Figure 12:
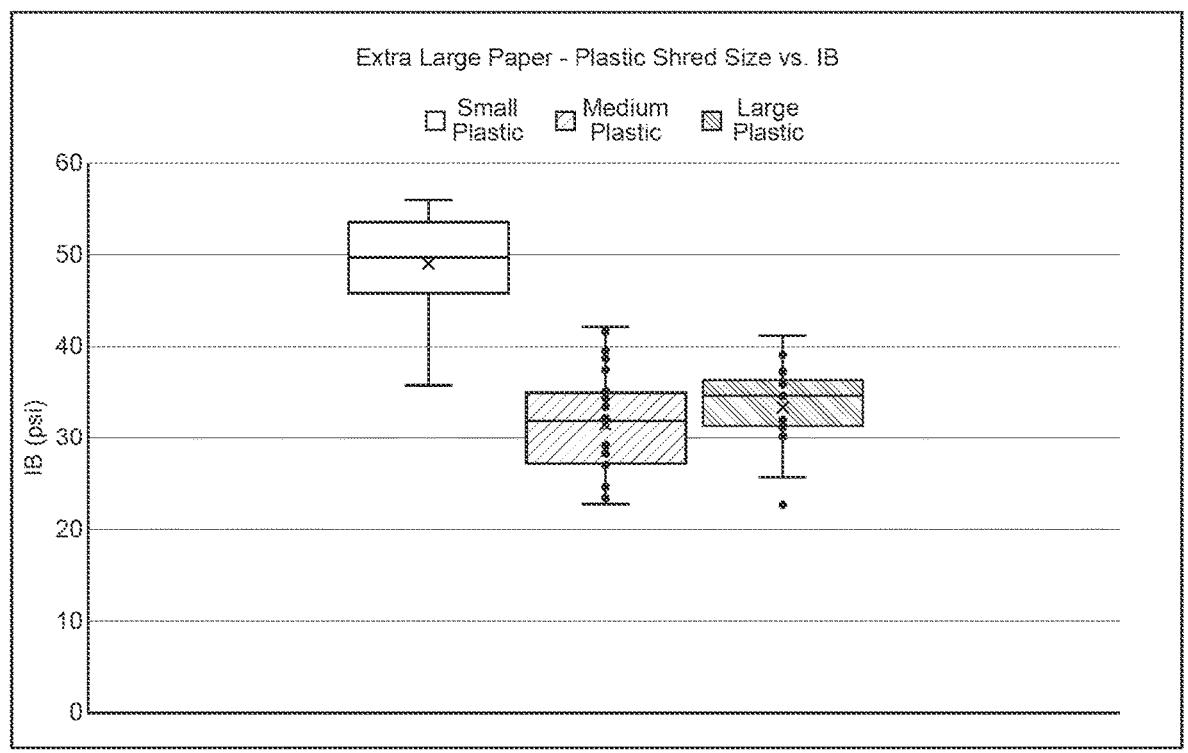
FIG. 12 is a graph depicting IB Values for extra large paper and varying plastic size.

FIG. 4 illustrates an impact resistant roof cover board having an impact resistant layer 410, a core 420, and an impact resistant layer 430. FIGS. 5-8 show results observed while holding the plastic shred constant and varying the paper shred size. The description of FIGS. 4-27 includes descriptions of the sizes of small, medium, large, and extra large. As described herein, small fragments may include a size range of 0-12 mm, medium fragments may include a size range of 13-24 mm, large fragments may include a size range of 25-33 mm, and extra large fragments may include a size range of 34 to 50 mm. For each plastic shred size, the smallest paper shred size yielded the highest IB values. With the exception of 19 mm plastic, the largest paper shred size yielded the lowest IB values.

In contrast to the effects of paper shred size, FIGS. 9-12 illustrate that there is not a clearly defined trend when varying plastic shred size. Unlike the paper shred size, smaller plastic size does not exclusively yield a stronger internal bond (IB) value. In several cases, larger plastic fragments actually resulted in a higher IB than smaller plastic fragments when paper size was held constant. This is not intuitive as plastic dispersion in the matrix was previously assumed to be a key factor to achieving high internal bonds. This work shows that, provided good mixing of the fragments, sufficient distribution of the plastic can be achieved as it melts, and strong bonds can be achieved even with larger plastic fragment size.

Figure 13:
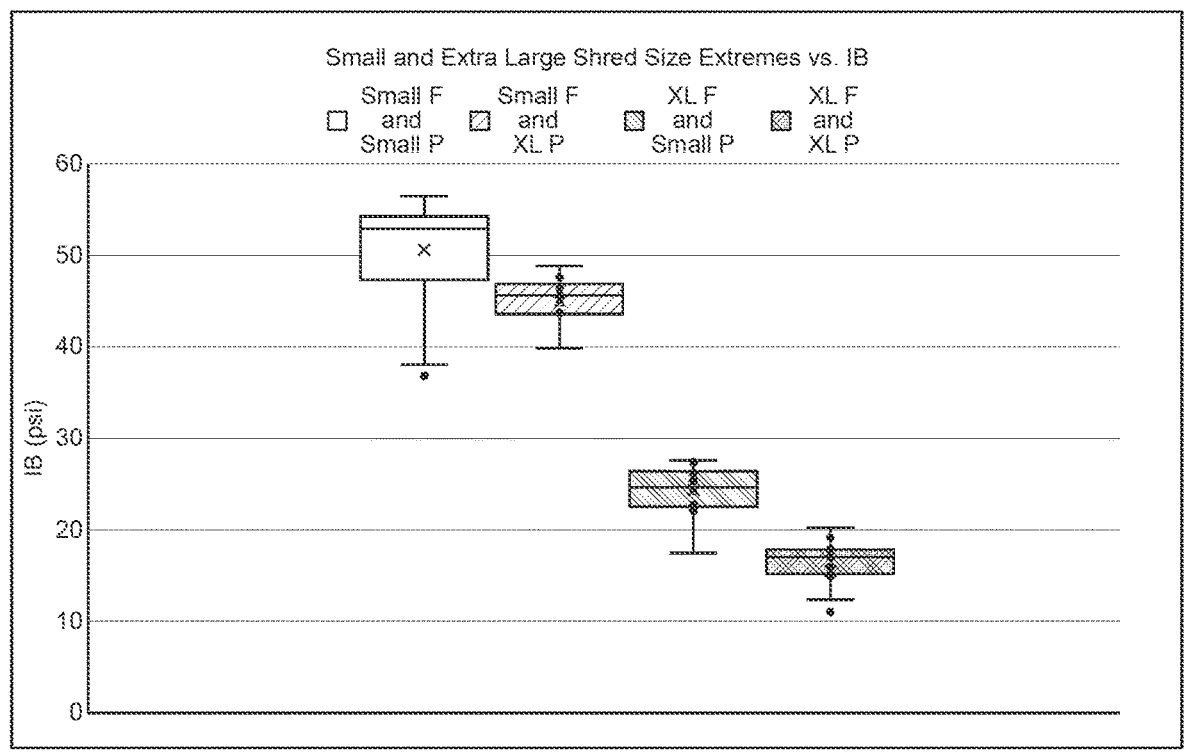
FIG. 13 is a graph depicting IB values for size extremes of example materials.
Figure 14:
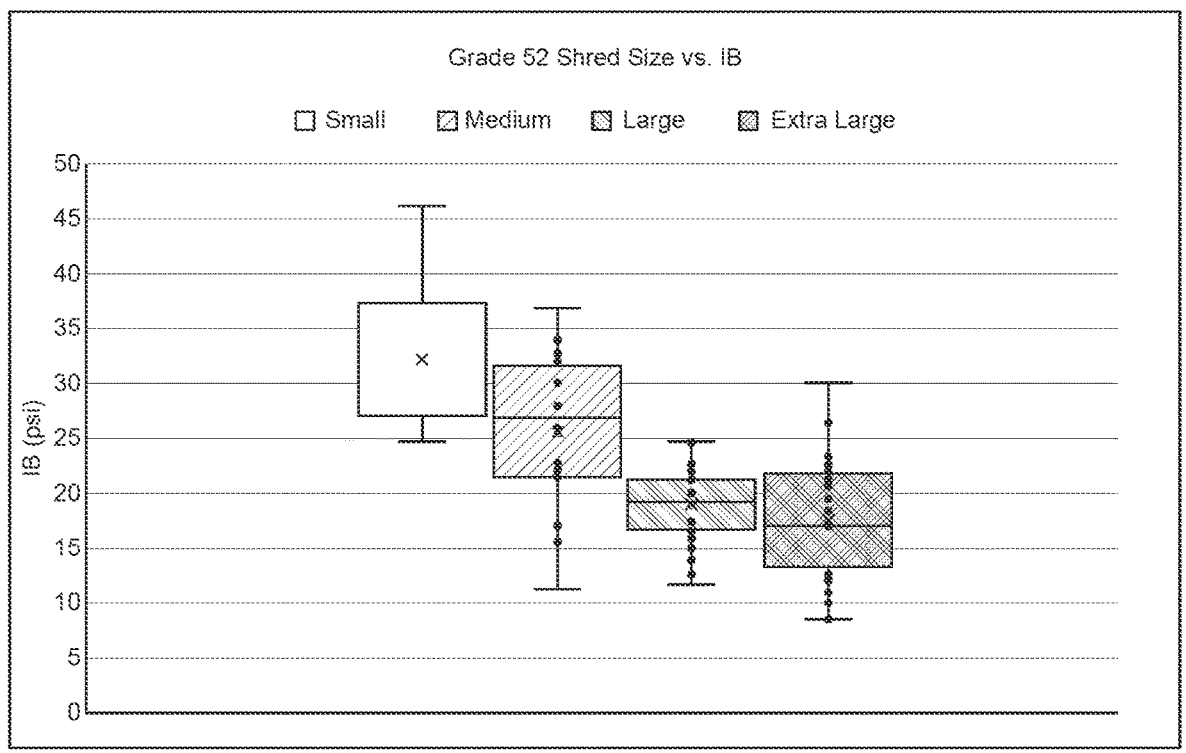
FIG. 14 is a graph depicting IB values for varying G52 shred sizes.
Figure 15:
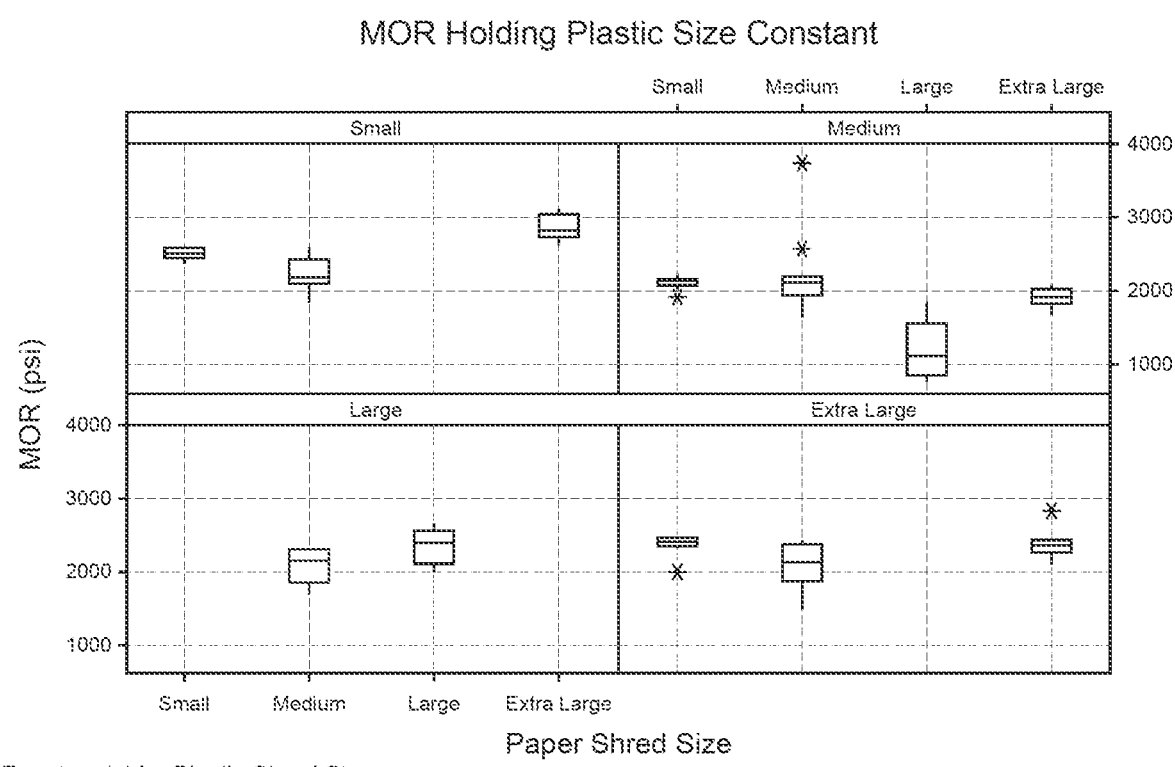
FIG. 15 is a graph depicting modulus of rupture (MOR) values for plastic sizes while varying paper size.
Figure 16:
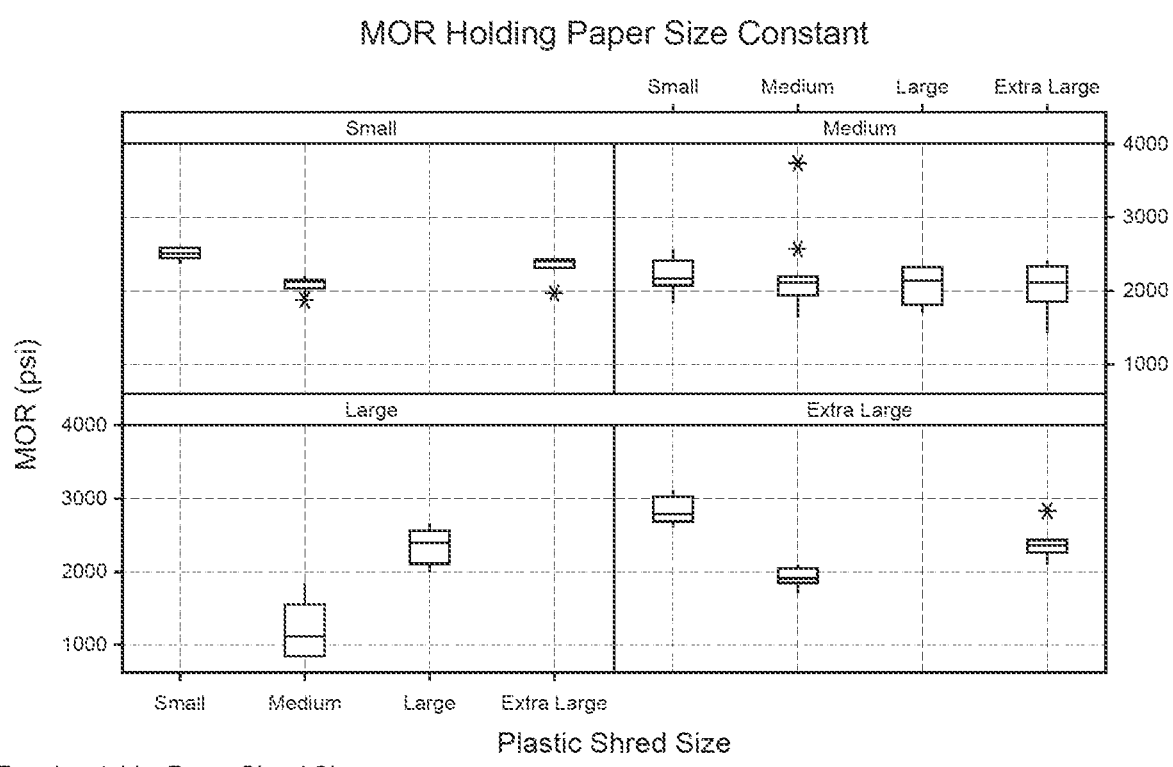
FIG. 16 is a graph depicting MOR Values for paper sizes while varying plastic size.
Figure 17:
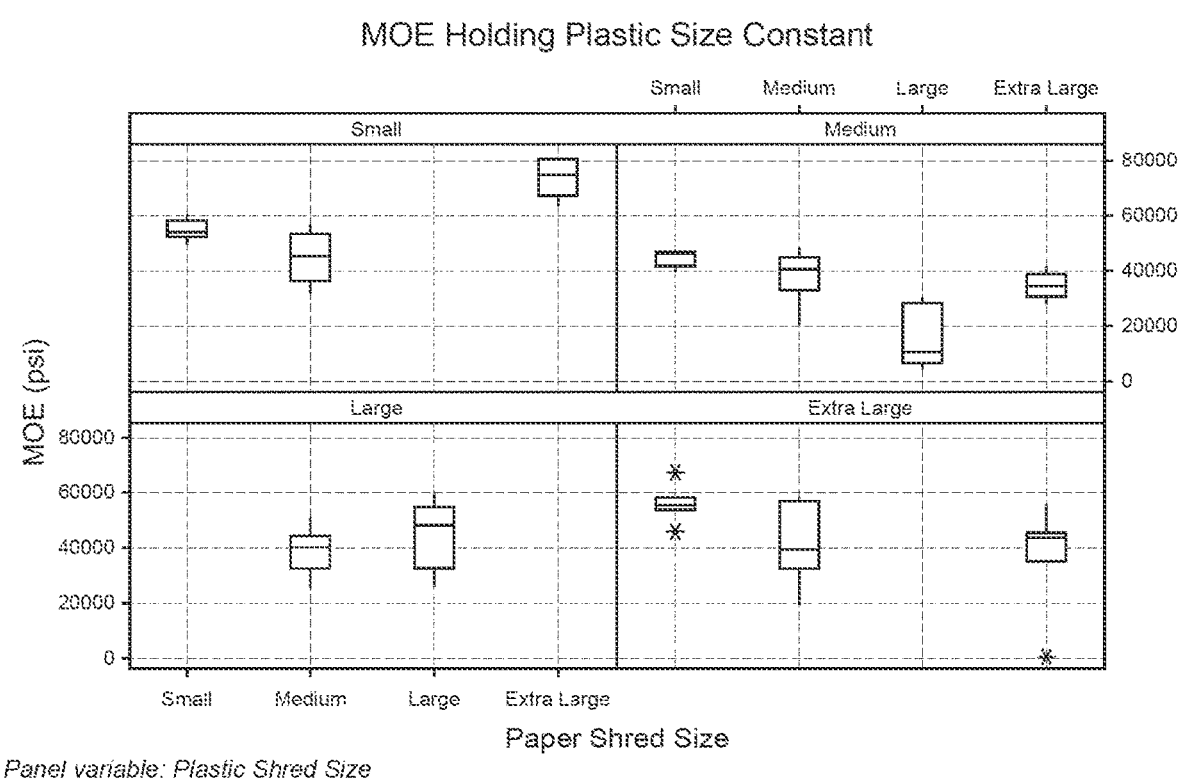
FIG. 17 is a graph depicting modulus of elasticity (MOE) values for plastic sizes while varying paper size.
Figure 18:
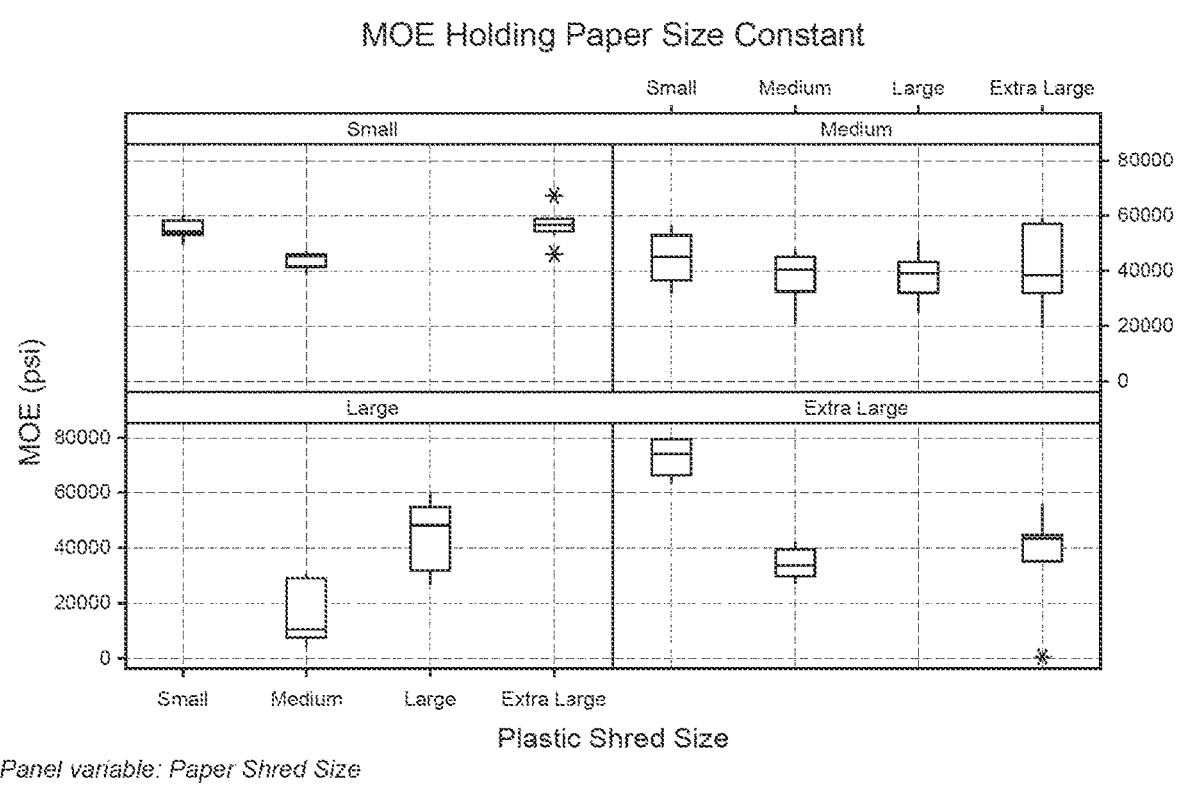
FIG. 18 is a graph depicting MOE values for paper sizes while varying plastic size.
Figure 19:
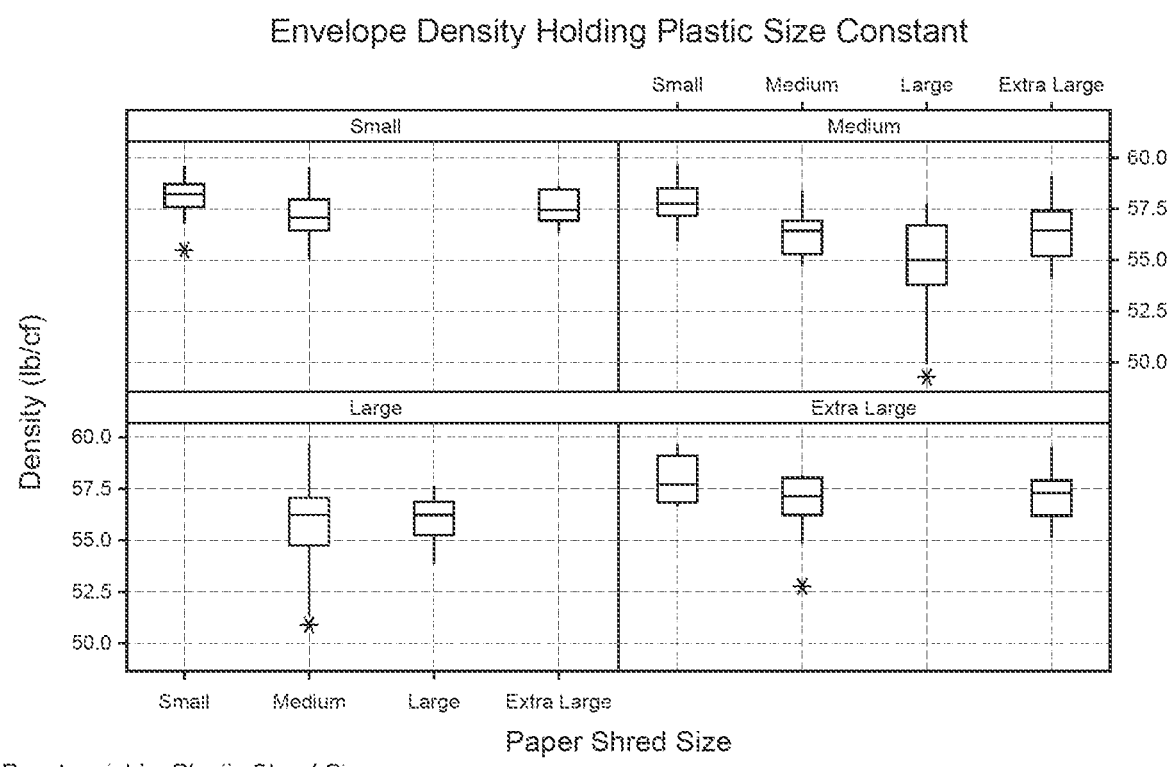
FIG. 19 is a graph depicting density for plastic sizes while varying paper size.
Figure 20:
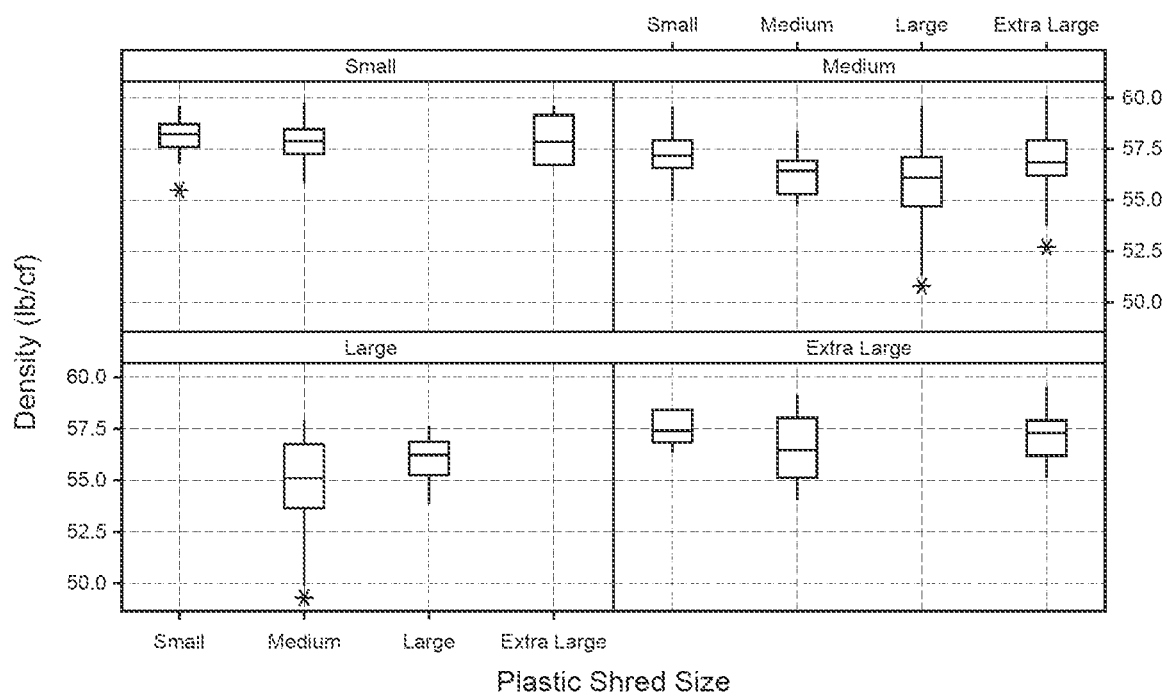
FIG. 20 is a graph depicting density for paper sizes while varying plastic size.

Examination of test results associated with panels made from the smallest and largest fragment sizes confirms that the paper shred size is more impactful than the plastic shred size. FIG. 13 displays the results of four extreme conditions with "F" representing fiber (paper) to avoid confusion. Panels made with the small paper fragments were associated with the highest IB values, including zero core failures out of 26 test specimens, while panels made with the extra large paper fragments were associated with lower IB values and 20 core failures out of 26 test specimens. Likewise, panels made with smaller plastic fragments were associated with higher IB values, although plastic fragment size was not the most influential factor in this body of work and panels made with relatively large plastic fragments still exhibited higher-than-required IB values. Panels made with G52 fragments follow the same trend of increasing internal bond strength as fragment size decreases. Results can be viewed in FIG. 14.

FIGS. 15-23 illustrate values of modulus of rupture (MOR), modulus of elasticity (MOE), and density for varied shred sizes. As mentioned previously, shred size does not have a significant impact on MOR, MOE, or density.

Figure 24:
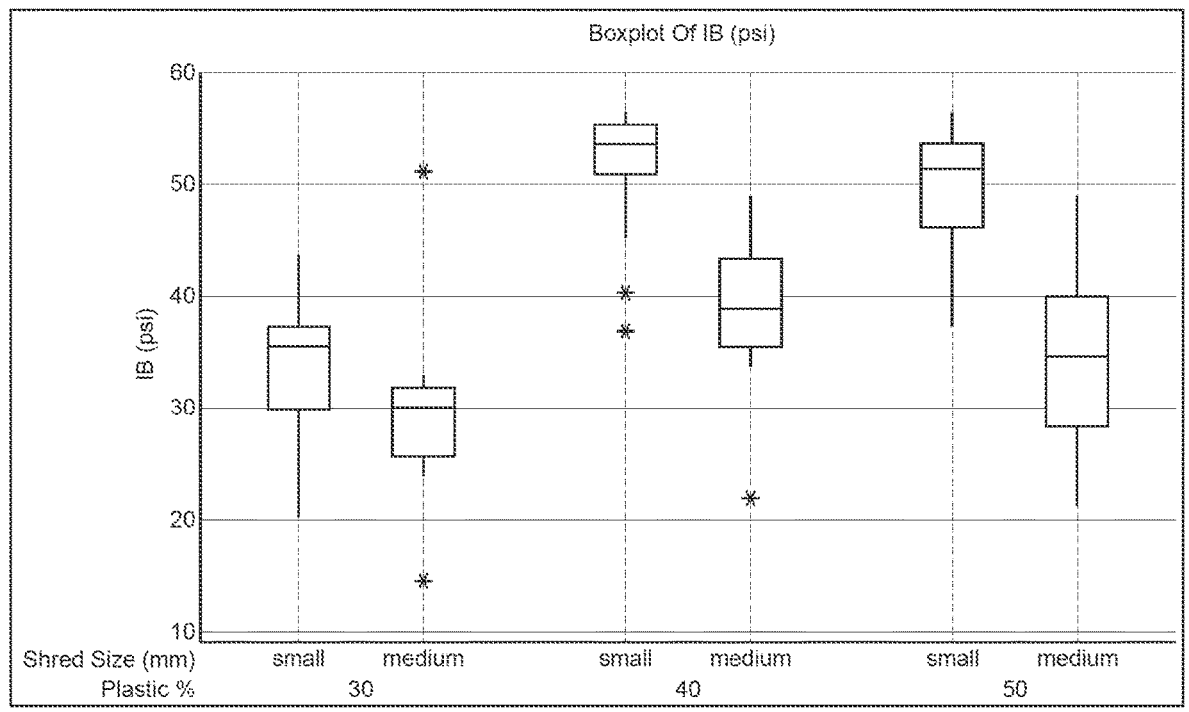
FIG. 24 is a graph depicting IB Values by shred Size and plastic content.

FIG. 24 illustrates the relationship between internal bond (IB) values, fragment size, and plastic content. As previously stated, there is commercial motivation to make panels with limited levels of plastic in order to achieve more thermally stable panels. Thus, sample boards were made with both 40% plastic (60% paper) and 30% plastic (70% paper) and a small fragment size (for both paper and plastic) or a medium fragment size (for both paper and plastic). Under these conditions average internal bond strength values of about 30-53 psi were obtained, which are significantly greater than targeted IB values. For panels made with a given plastic level (30, 40 or 50%), a small fragment size was always associated wither higher IB values than a medium fragment size.

Figure 21:
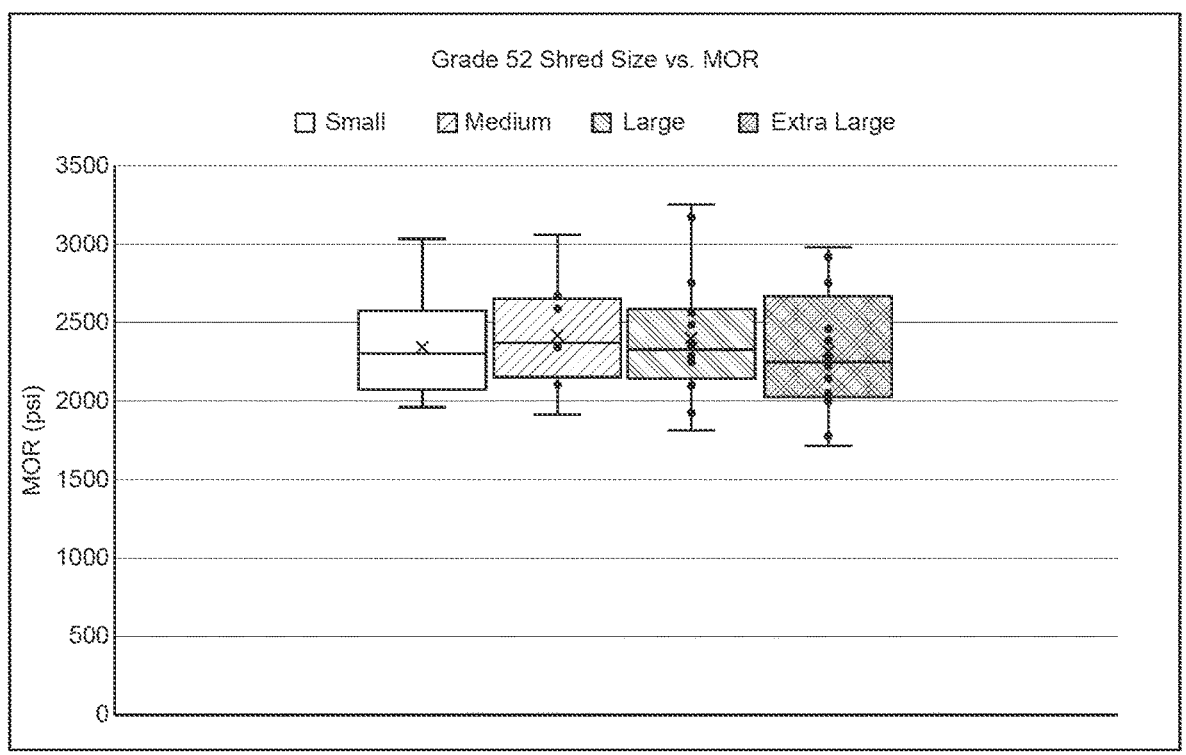
FIG. 21 is a graph depicting MOR values for G52 shred sizes.
Figure 22:
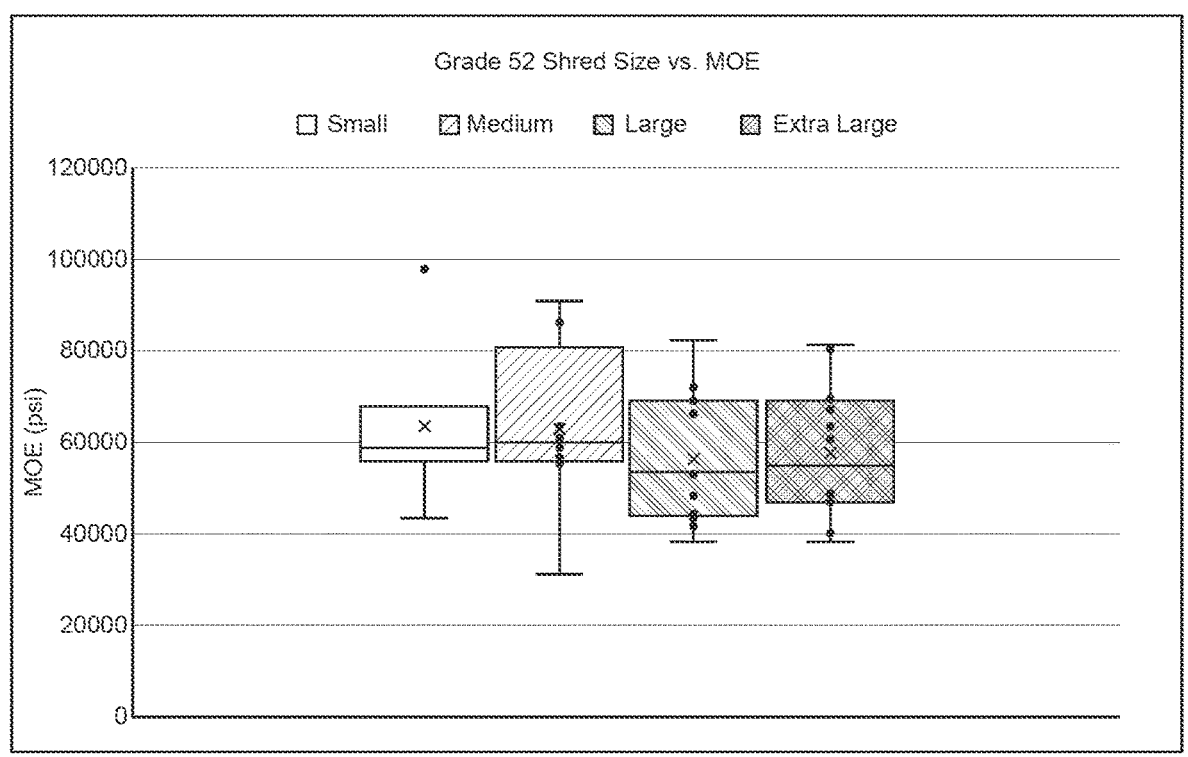
FIG. 22 is a graph depicting MOE values for G52 shred sizes.
Figure 23:
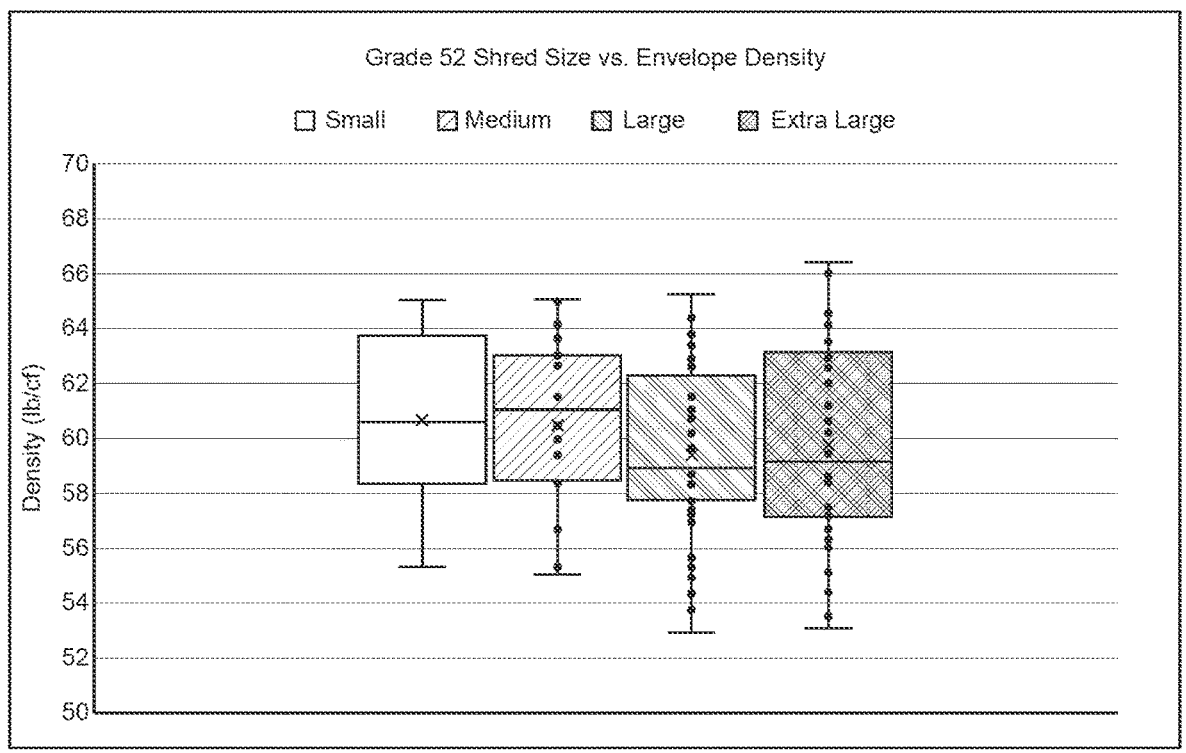
FIG. 23 is a graph depicting density for G52 shred sizes.
Figure 25:
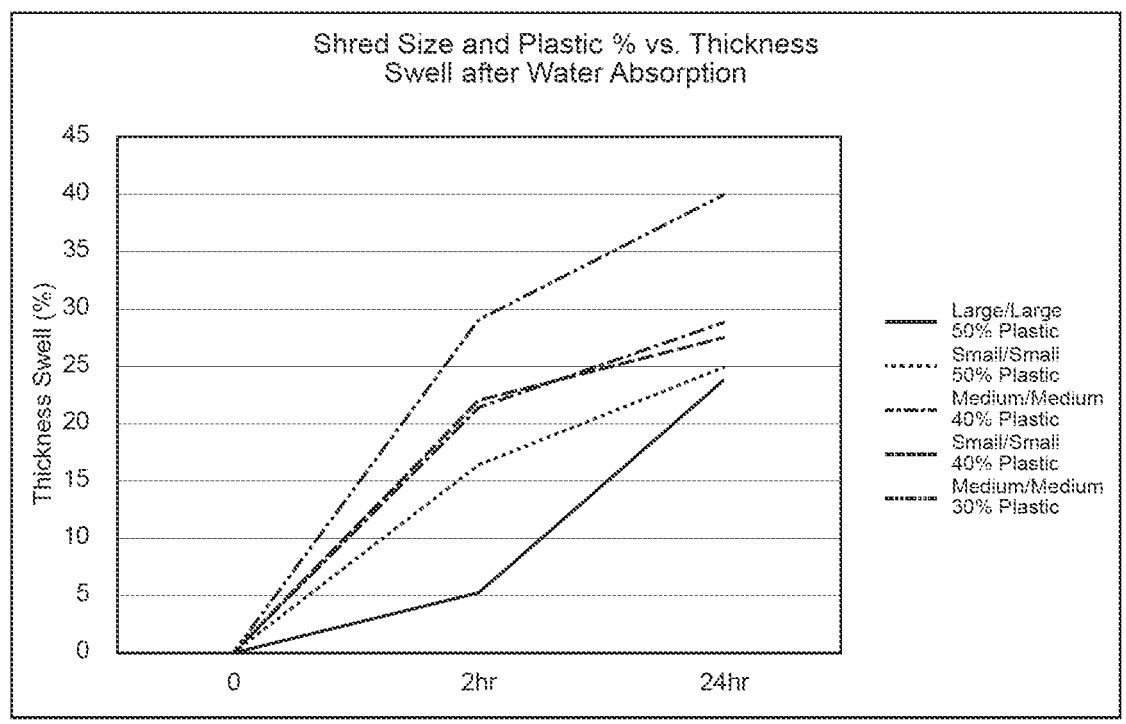
FIG. 25 is a graph depicting shred size and plastic percent vs. thickness swell after water absorption.

FIG. 25 illustrates the relationship between shred size, plastic percentage, and thickness swell in the ASTM D1037 water soak test. This water soak test involves submerging test specimens (6" 6") under 1" of water for periods of 2 and 24 hours. Specimens are retrieved after the soaking periods and are measured for thickness swell and mass gain. In this test method the thickness swell value decreased as plastic content increased and shred size decreased. As seen in FIG. 21, the 50% plastic sample swelled much less than any other sample, despite the larger shred size. Thus, for this metric plastic content was a stronger factor than shred size. Overlap was observed in the distribution of thickness swell test values for panels that contained 30% plastic and were based on either small fragments or medium fragments. Shred size being equal, the higher the plastic content, the lower the thickness swell value; however, smaller shred size at the same plastic content also resulted in less swelling.

Figure 26:
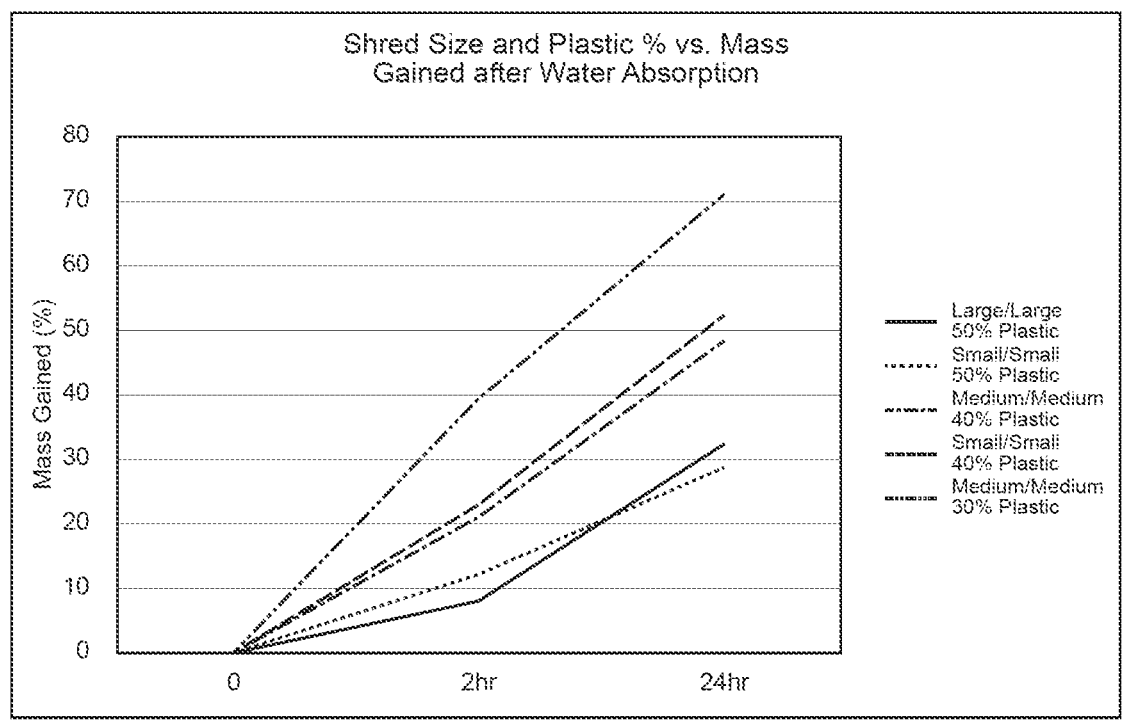
FIG. 26 is a graph depicting shred size and plastic percent vs. mass gained after water absorption.

FIG. 26 illustrates the relationship between shred size, plastic percentage, and mass gained during the water soak test. The impact of plastic content and shred size on water absorption was similar to the impact of plastic content and shred size on thickness swell. Plastic content seems to have had the greatest influence on water absorption, but shred size was also impactful. Overlap was observed in the distribution of water absorption values for panels that contained 40% plastic and were based on either small fragments or large fragments after soaking for 24 hours.

Figure 27:
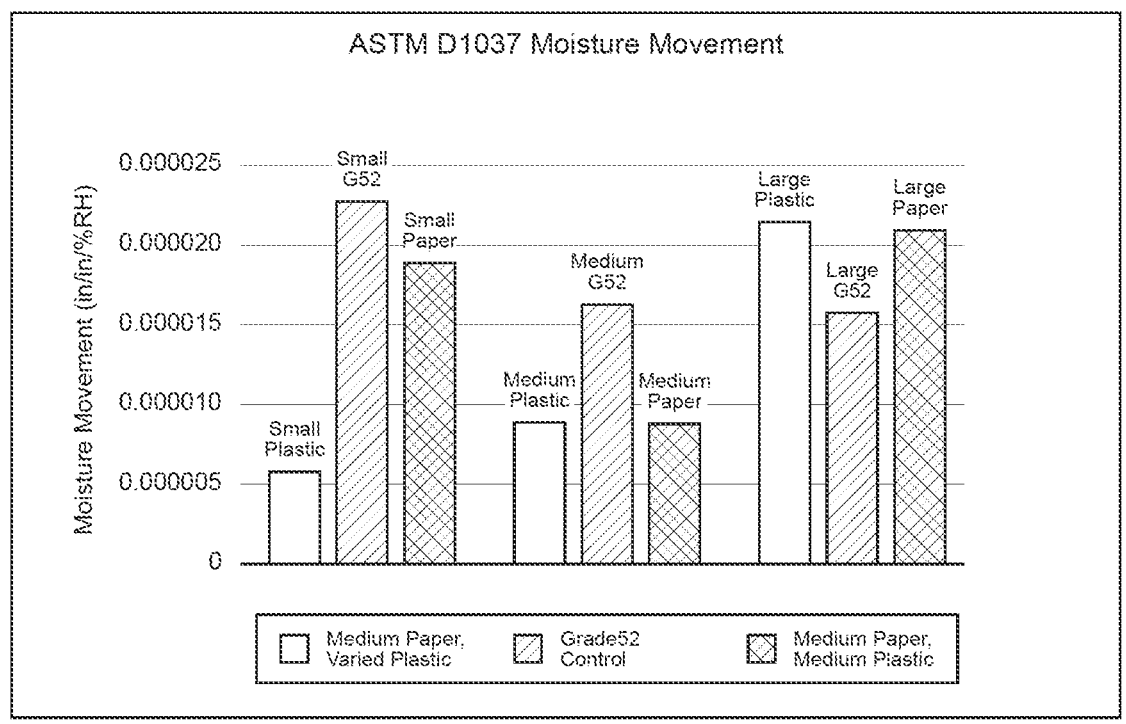
FIG. 27 is a graph depicting moisture movement of mixed paper and plastic (MPP) boards vs Grade 52 boards.

FIG. 27 illustrates the relationship between fragment size and fragment type on the linear expansion value of the panel when subjected to increased humidity. Specimens were placed into a conditioning chamber at 20° C. and 50% relative humidity until equilibrium weight was reached. The samples were then measured to obtain a 'dry' length. The relative humidity value was then increased to 90% and the same test specimens were allowed to equilibrate to the wetter condition. After mass equilibrium was reached at 90% relative humidity the samples were measured again to obtain a 'wet' length. The ratio of length expansion to the original specimen length was calculated and this quotient was then further divided by the relative humidity change to yield a linear expansion test score in units of inches of movement/inch of sample/% humidity. Compared to control boards made with Grade 52 cartons, the mixed paper and plastic boards had similar moisture movement on average. For panels made with G52 fragments, larger shred size was associated with reduced moisture movement. For panels made with mixed paper and plastic fragments, larger plastic fragments were associated with increased moisture movement Overall, smaller shred sizes for both paper and plastic result in better internal bond values, but the size of the paper is much more impactful than the size of the plastic. Smaller shred size, especially small paper, allows for the inclusion of up to 50% OCC in the paper fraction. Smaller shred size also has a positive impact on water absorption results, holding plastic content constant. The small shred size for both materials results in more fines being produced than the large shred size; however, the small plastic produces approximately double the number of fines than the small paper. Alternative refining equipment, such as a dual shaft shredder might limit the number of fines being produced. The quantity and particle size of the fines generated can be manipulated through changes in material sizes.

In contrast to trends which are well established in the wood-based composites industry, the present disclosure is quite surprising and unexpected. For instance, in the wood product series based on oriented strandboard, fiberboard, and particleboard, the primary structural elements of the composites are strands, fibers, and particles, respectively. The strands are larger than fibers, and the fibers are larger than particles. In contrast to the present disclosure, this series of wood-based composites is not associated with a consistent trend of increasing internal bond strength as the primary structural elements decrease in size. Likewise, in contrast to the present disclosure, this series of wood-based composites is not associated with a consistent trend of improved water resistance as the primary structural elements decrease in size. Furthermore, in contrast to the present disclosure, this series of wood-based composites is associated with a consistent and dramatic reduction in MOR and MOE values as the primary structural elements decrease in size. In fact, almost all composites, including glass fiber composites, are known to exhibit a reduction in MOR and MOE as the primary structural elements decrease in size. Thus, the behavior exhibited in the present disclosure is truly extraordinary.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing an improved cover board product, the method comprising:
   receiving waste materials or first use materials, the waste materials or first use materials containing a mixture of cellulose and plastic;
   separating the cellulose and the plastic from the mixture;
   selecting a cellulose to plastic shredding size ratio from a plurality of cellulose to plastic shredding size ratios based on a target performance property of the finished good; and
   adjusting a first shredding size of a first shredder and a second shredding size of a second shredder according to the selected cellulose to plastic shredding size ratio;
   shredding the separated cellulose using the first shredder having the first shredding size into a stream of cellulose and shredding the separated plastic using the second shredder having the second shredding size into a stream of plastic;
   selecting a cellulose to plastic ratio from a plurality of cellulose to plastic ratios;
   metering shredded cellulose from the stream of cellulose and shredded plastic from the stream of plastic according to the selected cellulose to plastic ratio;
   mixing the metered shredded cellulose and plastic;
   forming the mixture into a mat; and
   consolidating the mat into a finished good using heat and pressure.

2. The method of claim 1, further comprising:
   prior to shredding the separated cellulose and the separated plastic:
      separating the waste materials or first use materials by type, size, and/or shape;
      separating the waste materials or first use materials by density;
      separating the waste materials or first use materials by chemical composition; and
      separating ferrous and nonferrous metals from the waste materials or first use materials; and
   subsequent to shredding the separated cellulose and the separated plastic:
      reducing biological activity in or on the shredded materials;
      wherein mixing the metered shredded cellulose and plastic into the blended mat comprises organizing the metered shredded cellulose and plastic into a single layer or multilayer mat.

3. The method of claim 1, wherein the first shredding size is smaller than the second shredding size.

4. The method of claim 1, wherein the plastic is 1%-99% polyethylene, 1%-99% polypropylene, and/or 1%-99% other polymers comprising at least one of polyester (PET), ABS, PVC, or Nylon.

5. The method of claim 1, wherein the plastic comprises composite materials including polypropylene coated polyester fibers; low-density polyethylene film laminated to polyester film; or low-density polyethylene film laminated to nylon film.

6. The method of claim 1, wherein the cellulose comprises films including paper, corrugated cardboard, old corrugated cardboard, carton stock, aseptic cartons or gable top cartons.

7. The method of claim 1, wherein the first shredder or the second shredder comprises one of a flaker, a granulator, a hammer mill, an attrition mill, or a roller mill.

8. The method of claim 1, wherein selecting the cellulose to plastic ratio from the plurality of cellulose to plastic ratios comprises selecting a cellulose to plastic ratio that is less than 1.

9. The method of claim 1, wherein the first shredder or the second shredder are configured to respectively shred cellulose or plastic to a fragment size target between 2 um and 50 mm.

10. The method of claim 1, further comprising: storing the shredded cellulose and the shredded plastic in separate storage vessels.

11. The method of claim 1, wherein metering the shredded cellulose and the shredded plastic comprises:
retrieving metered shredded cellulose from the stream of shredded cellulose and shredded plastic from the stream of shredded plastic according to the selected cellulose to plastic ratio; and
blending the metered shredded cellulose and the metered shredded plastic into a single mixed stream.

12. The method of claim 1, wherein mixing the shredded cellulose and plastic into a blended mat comprises uniformly distributing the shredded cellulose and the shredded plastic into a blended mass and subsequently shaping the blended mass into a blended mat.

13. The method of claim 1, wherein the formed mat has a height between 1 inch and 24 inches and a width between 36 inches and 192 inches.

14. The method of claim 1, further comprising setting a pre-determined height of the blended mat by adjusting the first shredding size of the first shredder and the second shredding size of the second shredder according to a set pre-determined density.

15. The method of claim 1, further comprising selecting a cellulose to plastic shredding ratio from a plurality of cellulose to plastic shredding ratios according to a target internal bond strength, a target peel resistance, and a target wind uplift resistance of the finished good;
wherein selecting the cellulose to plastic ratio from the plurality of cellulose to plastic ratios comprises selecting the cellulose to plastic ratio based on the target internal bond strength, the target peel resistance, and the target wind uplift resistance of the finished good.

16. The method of claim 1, wherein the mixture of the metered shredded cellulose and plastic are formed into two or more separated layers.

17. The method of claim 16, further comprising arranging the metered shredded cellulose and the metered shredded plastic into the two or more separated layers each with a different cellulose to plastic shredding size ratio.

18. The method of claim 1, further comprising selecting a cellulose to plastic shredding ratio from a plurality of cellulose to plastic shredding ratios according to a target performance property of the finished good;
wherein selecting the cellulose to plastic ratio from the plurality of cellulose to plastic ratios comprises selecting the cellulose to plastic ratio based on the target performance property of the finished good.

19. The method of claim 18, wherein the target performance property comprises one or more of a target modulus of rupture (MOR), a target modulus of elasticity (MOE), a target interlaminate bond strength, a target flexural strength, a target impact resistance, or a target density.

20. The method of claim 1, further comprising selecting a cellulose to plastic shredding ratio from a plurality of cellulose to plastic shredding ratios according to a target water absorption property of the finished good;
wherein selecting the cellulose to plastic ratio from the plurality of cellulose to plastic ratios comprises selecting the cellulose to plastic ratio based on the target water absorption property of the finished good.

21. The method of claim 1, further comprising selecting a cellulose to plastic shredding ratio from a plurality of cellulose to plastic shredding ratios according to a target moisture movement and thermal movement of the finished good;
wherein selecting the cellulose to plastic ratio from the plurality of cellulose to plastic ratios comprises selecting the cellulose to plastic ratio based on the target moisture movement and thermal movement of the finished good.

22. The method of claim 1, further comprising selecting a cellulose to plastic shredding ratio from a plurality of cellulose to plastic shredding ratios according to a target finished good formulation of the finished good.

23. The method of claim 1, further comprising selecting a cellulose to plastic shredding ratio from a plurality of cellulose to plastic shredding ratios according to a target layer height or thickness of the finished good;
wherein selecting the cellulose to plastic ratio from the plurality of cellulose to plastic ratios comprises selecting the cellulose to plastic ratio according to a target layer height or thickness of the finished good.

24. The method of claim 1, further comprising selecting a cellulose to plastic shredding ratio from a plurality of cellulose to plastic shredding ratios according to a target quantity and particle size of fines generated during the shredding of the cellulose and the plastic.

25. The method of claim 1, further comprising collecting dust generated during the shredding and the forming and adding the collected dust into the blended mat.

26. The method of claim 25, wherein the amount of dust added into the blended mat is between 0% and 15% of the finished good by weight.

27. The method of claim 1, further comprising adding powdered polymers sized 2-150 μm to the metered separated cellulose of the blended mat at a rate of 2%-15% of the finished good by weight.

28. The method of claim 1, wherein the cellulose comprises paper which refers to all cellulosic material commonly referred to but not limited to paper, tissue paper, news print, pulp, OCC, cardboard, card stock, liner board, fiber, chopped fiber, hemp fiber.

29. The method of claim 1, wherein forming the finished good comprises arranging top and bottom layers using materials of similar size and arranging a core layer using similar sized materials that are larger or smaller than the top and bottom layers.

30. The method of claim 29, wherein the materials of the top and bottom layer are plastic and cellulose fragments ranging in size from 12 mm to 34 mm.

31. The method of claim 29, wherein the materials of the core layer are plastic and cellulose fragments ranging in size from 12 mm to 34 mm.

32. The method of claim 29, wherein the materials of the top and bottom layers have a cellulose to plastic ratio of between 2%:98% and 98%:2%.

33. The method of claim 29, wherein the materials of the core layer have a cellulose to plastic ratio of between 2%:98% and 98%:2%.

34. The method of claim 29, wherein the top and bottom layers are 5% to 95% of a total thickness of the finished good.

35. The method of claim 29, wherein the core layer is 5% to 95% of a total thickness of the finished good.

36. The method of claim 1, further comprising adjusting the first shredding size of the first shredder by inserting a screen with a mesh size of 34 mm or less into the first shredder.

37. The method of claim 1, further comprising adjusting the first shredding size of the first shredder by inserting a screen with a mesh size of 19 mm or less into the first shredder.

38. The method of claim 1, further comprising adjusting the first shredding size of the first shredder by inserting a screen with a mesh size of 15 mm or less into the first shredder.

39. The method of claim 1, further comprising adjusting the first shredding size of the first shredder by inserting a screen with a mesh size of 12 mm or less into the first shredder.

40. The method of claim 1, wherein mixing the shredded cellulose and the shredded plastic comprises mixing the shredded cellulose and the shredded plastic at a ratio of about 70/30-50/50 (cellulose/plastic).

41. The method of claim 1, wherein forming the finished good comprises heating all layers in the blended mat to a temperature of about 220 F or higher.

42. The method of claim 1, wherein forming the finished good comprises heating all layers in the blended mat to a temperature of about 250 F or higher.

43. The method of claim 1, wherein forming the finished good comprises heating all layers in the blended mat to a temperature of about 300 F or higher.

44. The method of claim 1, further comprising adjusting the first shredding size of the first shredder by inserting a screen with a mesh size of 19 mm or less into the first shredder;
  wherein selecting the cellulose to plastic ratio comprises selecting a cellulose to plastic ratio of between about 70/30-50/50 (cellulose/plastic); and
  wherein forming the finished good comprises heating layers in the blended mat to a temperature of about 220 F or higher.

45. The method of claim 1, further comprising:
  prior to shredding the separated cellulose and the separated plastic:
    separating the waste materials or first use materials by type; and
    generating material streams having unique size and type classifications; and
  wherein forming the blended mat into the finished good comprises heating and applying pressure to the blended mat prior to cooling and applying pressure to the mat.

46. The method of claim 1, wherein selecting the cellulose to plastic shredding size ratio comprises:
  receiving a selection of a type of finished good or the target performance property of the finished good;
  retrieving a first specification corresponding to the selected type of finished good or the selected target performance property of the finished good, the first specification defining the cellulose to plastic shredding size ratio.

47. The method of claim 46, wherein selecting the cellulose to plastic ratio comprises retrieving a second specification corresponding to the selected type of finished good or the selected target performance property of the finished good, the second specification defining the cellulose to plastic ratio, wherein retrieving the first specification comprises accessing a first file stored in a memory of a computing device, and wherein retrieving the second specification comprises accessing a second file stored in the memory of the computing device.

* * * * *